(12) United States Patent
Sherman et al.

(10) Patent No.: US 9,904,001 B2
(45) Date of Patent: Feb. 27, 2018

(54) MARKETING STRIP WITH VISCOELASTIC LIGHTGUIDE

(71) Applicant: 3M INNOVATIVE PROPERTIES COMPANY, St. Paul, MN (US)

(72) Inventors: Audrey A. Sherman, Woodbury, MN (US); Michael A. Meis, Stillwater, MN (US); Kevin R. Schaffer, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 15/121,457

(22) PCT Filed: Mar. 17, 2015

(86) PCT No.: PCT/US2015/020987
§ 371 (c)(1),
(2) Date: Aug. 25, 2016

(87) PCT Pub. No.: WO2015/142864
PCT Pub. Date: Sep. 24, 2015

(65) Prior Publication Data
US 2016/0377796 A1    Dec. 29, 2016

Related U.S. Application Data

(60) Provisional application No. 61/954,807, filed on Mar. 18, 2014, provisional application No. 62/023,260, filed on Jul. 11, 2014.

(51) Int. Cl.
*G09F 3/18* (2006.01)
*F21V 8/00* (2006.01)
(Continued)

(52) U.S. Cl.
CPC ......... *G02B 6/0065* (2013.01); *G02B 6/0021* (2013.01); *G02B 6/0036* (2013.01);
(Continued)

(58) Field of Classification Search
CPC .................. C09J 2433/00; C09J 153/00; C09J 2201/606; G09F 3/204; G09F 3/20;
(Continued)

(56) References Cited

U.S. PATENT DOCUMENTS 2,736,721 A    2/1956  Dexter
3,086,308 A *  4/1963  Ternouth ................... G09F 3/20
                                                      312/234.4
(Continued)

FOREIGN PATENT DOCUMENTS

JP    2002-091323    3/2002
KR    2004-21333     7/2006
(Continued)

OTHER PUBLICATIONS

Falk, "Seeing the Light: Optics in Nature, Photography, Color, Vision, and Holography" Harper & Row, New York, 1986, pp. 53-56.
(Continued)

*Primary Examiner* — Shin Kim

(57) ABSTRACT

Marketing strips having a light source and a flexible viscoelastic lightguide for displaying products or product related information, or illuminating a graphic on the marketing strip and products adjacent it. Light from the light source enters the viscoelastic lightguide and is transported within the lightguide by total internal reflection until the light exits from surfaces of the lightguide and through the graphic. The viscoelastic lightguide can include a pressure-sensitive adhesive, which adheres the lightguide to the marketing strip and enhances structural support for it. The
(Continued)

light from the lightguide can illuminate products and labels on the marketing strip. The lightguide can also include a bevelled edge with light exiting the edge downward and backward from the marketing strip to illuminate products it.

15 Claims, 20 Drawing Sheets

(51) Int. Cl.
*G09F 13/04* (2006.01)
*G09F 13/14* (2006.01)

(52) U.S. Cl.
CPC ......... *G02B 6/0038* (2013.01); *G02B 6/0088* (2013.01); *G09F 13/04* (2013.01); *G09F 13/14* (2013.01); *G09F 2013/0422* (2013.01)

(58) Field of Classification Search
CPC ....... G09F 13/04; G09F 13/18; G02B 6/0035; G02B 5/305; G02B 6/0053
USPC ........ 362/601–615; 425/212, 343; 40/661.03
See application file for complete search history.

(56) References Cited

U.S. PATENT DOCUMENTS

| | | | |
|---|---|---|---|
| 3,894,225 A * | 7/1975 | Chao | G09F 13/28 174/117 A |
| 4,373,466 A * | 2/1983 | MacPhee | G09F 3/20 116/315 |
| 4,422,719 A * | 12/1983 | Orcutt | B29D 11/00711 362/562 |
| 4,554,324 A | 11/1985 | Husman et al. | |
| 4,737,559 A | 4/1988 | Kellen et al. | |
| 5,214,119 A | 5/1993 | Leir et al. | |
| 5,220,739 A * | 6/1993 | Chich | G09F 13/04 40/550 |
| 5,394,632 A * | 3/1995 | Gebka | G09F 3/204 40/649 |
| 5,506,279 A | 4/1996 | Babu et al. | |
| 5,515,632 A * | 5/1996 | Gebka | G09F 3/204 40/649 |
| 5,625,969 A * | 5/1997 | Vogler | G09F 15/0012 40/611.12 |
| 5,825,543 A | 10/1998 | Ouderkirk et al. | |
| 5,828,488 A | 10/1998 | Ouderkirk et al. | |
| 5,867,316 A | 2/1999 | Carlson et al. | |
| 5,882,774 A | 3/1999 | Jonza et al. | |
| 6,083,856 A | 4/2000 | Joseph et al. | |
| 6,105,295 A * | 8/2000 | Brinkman | G09F 3/204 248/214 |
| 6,179,948 B1 | 1/2001 | Merrill et al. | |
| 6,288,172 B1 | 9/2001 | Goetz et al. | |
| 6,352,761 B1 | 3/2002 | Hebrink et al. | |
| 6,368,699 B1 | 4/2002 | Gilbert et al. | |
| 6,379,016 B1 | 4/2002 | Boyd et al. | |
| 6,430,857 B1 * | 8/2002 | Nagel | G09F 3/20 40/642.02 |
| 6,569,521 B1 | 5/2003 | Sheridan et al. | |
| 6,663,978 B1 | 12/2003 | Olson et al. | |
| 6,827,886 B2 | 12/2004 | Neavin et al. | |
| 6,927,900 B2 | 8/2005 | Liu et al. | |
| 6,935,061 B2 * | 8/2005 | Thompson | G09F 3/204 40/658 |
| 6,972,813 B1 | 12/2005 | Toyooka | |
| 6,991,695 B2 | 1/2006 | Tait et al. | |
| 7,046,905 B1 | 5/2006 | Gardiner et al. | |
| 7,090,922 B2 | 8/2006 | Zhou et al. | |
| 7,255,920 B2 | 8/2007 | Everaerts et al. | |
| 7,315,418 B2 | 1/2008 | DiZio et al. | |
| 7,316,089 B2 * | 1/2008 | Brinkman | G09F 3/204 40/343 |
| 7,361,474 B2 | 4/2008 | Siegler | |
| 7,481,563 B2 | 1/2009 | David et al. | |
| 7,574,822 B1 * | 8/2009 | Moore | G09F 3/204 40/575 |
| 7,721,659 B2 * | 5/2010 | Fast | A47B 57/58 108/60 |
| 8,309,650 B2 | 11/2012 | Determan et al. | |
| 8,378,046 B2 | 2/2013 | Determan et al. | |
| 8,496,371 B2 * | 7/2013 | Chang | F21V 7/22 349/65 |
| 8,673,419 B2 | 3/2014 | Determan et al. | |
| 8,777,473 B2 * | 7/2014 | Schmuck | G02B 6/0035 362/602 |
| 8,793,913 B1 * | 8/2014 | Zobel | G09F 3/204 40/661.03 |
| 2003/0034445 A1 | 2/2003 | Boyd et al. | |
| 2003/0231483 A1 * | 12/2003 | Higashiyama | G02B 6/0038 362/610 |
| 2004/0050812 A1 * | 3/2004 | Rojas | G09F 3/204 211/134 |
| 2005/0052750 A1 | 3/2005 | King et al. | |
| 2005/0135117 A1 * | 6/2005 | Lamb | G02B 6/0076 362/615 |
| 2005/0195588 A1 * | 9/2005 | Kang | G02B 5/0226 362/19 |
| 2005/0276071 A1 | 12/2005 | Sasagawa et al. | |
| 2006/0014453 A1 * | 1/2006 | Maia | B32B 27/12 442/41 |
| 2006/0084780 A1 | 4/2006 | Hebrink et al. | |
| 2006/0117627 A1 * | 6/2006 | Fast | G09F 3/204 40/642.01 |
| 2006/0216524 A1 | 9/2006 | Klun et al. | |
| 2006/0226561 A1 | 10/2006 | Merrill et al. | |
| 2007/0047080 A1 | 3/2007 | Stover et al. | |
| 2007/0047254 A1 | 3/2007 | Schardt et al. | |
| 2007/0230175 A1 * | 10/2007 | Montgomery | F21S 8/035 362/249.16 |
| 2007/0243844 A1 * | 10/2007 | Cunningham | G02B 6/0018 455/255 |
| 2007/0292650 A1 | 12/2007 | Suzuki | |
| 2008/0232135 A1 | 9/2008 | Kinder et al. | |
| 2009/0067151 A1 | 3/2009 | Sahlin et al. | |
| 2010/0061093 A1 * | 3/2010 | Janssen | F21K 9/00 362/235 |
| 2010/0297406 A1 | 11/2010 | Schaffer et al. | |
| 2011/0001901 A1 * | 1/2011 | Solomon | G02B 6/0063 349/65 |
| 2011/0020640 A1 | 1/2011 | Sherman et al. | |
| 2011/0064916 A1 | 3/2011 | Sherman et al. | |
| 2011/0134623 A1 | 6/2011 | Sherman et al. | |
| 2011/0165361 A1 | 7/2011 | Sherman et al. | |
| 2011/0176325 A1 | 7/2011 | Sherman et al. | |
| 2011/0273902 A1 * | 11/2011 | Chang | F21V 7/22 362/606 |
| 2012/0268963 A1 * | 10/2012 | Gourlay | G02B 6/0021 362/602 |
| 2013/0201720 A1 | 8/2013 | Sherman et al. | |
| 2013/0250607 A1 * | 9/2013 | Schmuck | G02B 6/0035 362/602 |
| 2013/0265784 A1 | 10/2013 | Nieberle | |
| 2014/0153279 A1 * | 6/2014 | Weyer | A47F 5/0869 362/604 |
| 2015/0338567 A1 * | 11/2015 | Stevenson | G02B 6/0051 362/601 |
| 2015/0356894 A1 * | 12/2015 | Petrocy | G09F 13/005 40/545 |
| 2016/0035256 A1 * | 2/2016 | Trinh | G09F 7/18 40/611.01 |

FOREIGN PATENT DOCUMENTS

| | | |
|---|---|---|
| KR | 2011-0010267 | 2/2011 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01440 | 1/1997 |

(56) References Cited

FOREIGN PATENT DOCUMENTS

| WO | WO 99/36248 | 7/1999 |
| WO | WO 99/36262 | 7/1999 |
| WO | WO 99/42536 | 8/1999 |

OTHER PUBLICATIONS

Satas, Handbook of Pressure-Sensitive Adhesive Technology, $2^{nd}$ Ed, 172, 1989, pp. 1-9.
International Search report for PCT International Application No. PCT/US2015/020987 dated Jun. 25, 2015, 3 pages.

* cited by examiner

MARKETING STRIP WITH VISCOELASTIC LIGHTGUIDE

CROSS REFERENCE TO RELATED APPLICATIONS

This application is a national stage filing under 35 U.S.C. 371 of PCT/US2015/020987, filed Mar. 17, 2015, which claims the benefit of U.S. Provisional Application No. 61/954,807, filed Mar. 18, 2014, and which claims the benefit of U.S. Provisional Application No. 62/023,260, filed Jul. 11, 2014, the disclosures of which are incorporated by reference in their entireties herein.

BACKGROUND

Lightguides are used to facilitate distribution of light from a light source over an area much larger than the light source. Lightguides comprise optically transmissive materials and may have different forms such as slab, wedge, and pseudo-wedge forms. Most lightguides are designed to accept light at an edge surface and allow this light to propagate by total internal reflection between a back surface and an output surface, toward an opposing edge surface from which the light enters. Light is emitted uniformly from the output surface using extracting features that are positioned in various types of patterns on the output surface.

SUMMARY

Embodiments of the present invention include marketing strips having flexible lightguides.

A first marketing strip with a flexible lightguide, consistent with the present invention, includes a first elongated section having an edge portion and a second elongated section arranged non-parallel with the first elongated section at a side opposite the edge portion. A flexible lightguide is located on the first elongated section between the edge portion and the second elongated section. The flexible lightguide includes two flexible substrates, a viscoelastic layer disposed between the substrates, and a light source in the viscoelastic layer. Light emitted by the light source enters the viscoelastic layer and is transported within the lightguide by total internal reflection.

A second marketing strip with a flexible lightguide, consistent with the present invention, includes a front elongated section having a first top edge and comprising a transparent or translucent material, and a back elongated section having a second top edge. The back elongated section is at least partially co-extensive with the front elongated section, and the first and second top edges form an opening between the front and back elongated sections. A flexible lightguide is located between the front and back elongated sections. The flexible lightguide includes a flexible substrate, a reflector, a viscoelastic layer disposed between the substrate and the reflector, a graphic on a side of the flexible substrate opposite the viscoelastic layer, and a light source in the viscoelastic layer. Light emitted by the light source enters the viscoelastic layer and is transported within the lightguide by total internal reflection. The flexible lightguide is positioned with the graphic adjacent the front elongated section and the light source adjacent the opening.

BRIEF DESCRIPTION OF THE DRAWINGS

The accompanying drawings are incorporated in and constitute a part of this specification and, together with the description, explain the advantages and principles of the invention.

FIG. 19b is a side view of the flexible viscoelastic lightguide of FIG. 19a.

FIG. 21b is a side view of the marketing strip of FIG. 21a.

FIG. 22b is a side view of the marketing strip of FIG. 22a.

FIG. 23b is a side view of the flexible viscoelastic lightguide of FIG. 23a.

FIG. 24b is a side view of the marketing strip of FIG. 24a.

DETAILED DESCRIPTION

Viscoelastic Lightguides

Figure 1A:
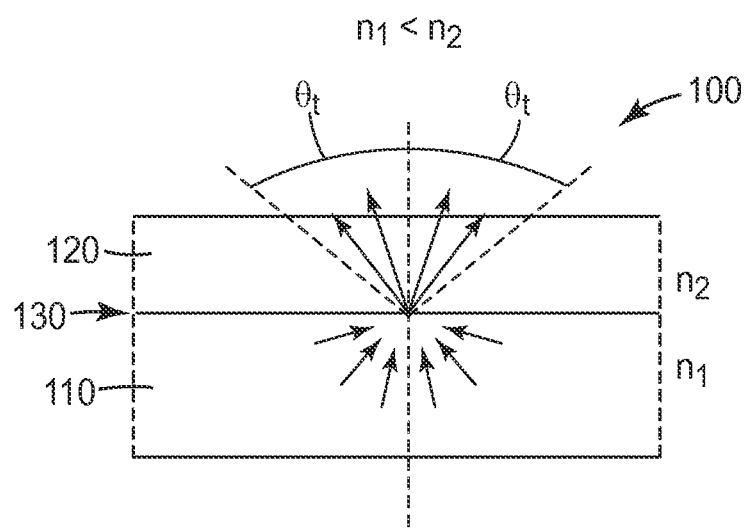
FIGS. 1a and 1b are schematic cross sections of layers illustrating principles of geometric optics.

Examples of viscoelastic lightguides are disclosed in U.S. Patent Applications Publication Nos. 2011/0176325 and 2011/0134623, both of which are incorporated herein by reference as if fully set forth.

Examples of viscoelastic lightguides with marketing strips are disclosed in U.S. Provisional Patent Application Ser. No. 61/954,807, entitled "Marketing Strip with Viscoelastic Lightguide," and filed Mar. 18, 2014, which is incorporated herein by reference as if fully set forth. Examples of viscoelastic lightguides with marketing strips are also disclosed in U.S. Provisional Patent Application Ser. No. 62/023,260, entitled "Marketing Strip with Viscoelastic Lightguide," and filed Jul. 11, 2014, which is incorporated herein by reference as if fully set forth.

The optical device disclosed herein includes a light source that emits light, and the light is managed by a viscoelastic lightguide. The optical device may provide one or more advantages. For example, the viscoelastic lightguide is generally soft and compliant such that the light source may be easily coupled to the lightguide so that light can enter the lightguide. In some embodiments, the viscoelastic lightguide comprises a PSA which is generally tacky at room temperature. The light source may then be coupled to the viscoelastic lightguide such that it is adhered to the lightguide. This may facilitate assembly of the optical device itself or constructions in which the device is used.

Light is typically extracted from the viscoelastic lightguide at one or more desired locations or areas of the lightguide. In some embodiments, an extractor may be used to extract light from the viscoelastic lightguide. Again, due to the soft and compliant properties of the viscoelastic lightguide, the extractor may be easily coupled to the lightguide so that light can enter the lightguide. If the viscoelastic lightguide comprises a PSA, the extractor can be directly adhered to the lightguide without the need for additional materials to bond the two together.

The optical device may be used to provide light anywhere it is desired. The optical articles and optical devices may be designed for interior and/or exterior use. The optical articles and optical devices may be designed for household, commercial and/or industrial use. The optical device may be used and/or provided in a construction so that it is portable, i.e., it is a portable source of light. Lighted tapes, signs, labels, stickers, cut-outs, etc. are examples of portable constructions that may be made using the optical device. The optical device may also be used and/or provided in a more stationary construction such as in an electronic display device.

The optical device may also be used to provide "light on demand", e.g., the light source may be activated only under certain conditions such as when parking a vehicle. The optical device may be used to provide exterior lighting of a vehicle, e.g., for tail lights, replacing tail light cavities and their lighting assemblies and which are very space consuming.

The viscoelastic lightguide can be used in place of a conventional lightguide used to light display devices. For example, the viscoelastic lightguide may be used to replace a solid or hollow lightguide that distributes light from one or more substantially linear or point light sources. The viscoelastic lightguide can be assembled in a display device without the need for additional materials to bond the lightguide to the display device.

The optical device may also be very adaptable, even by a user, so that it can be used in different lighting forms and constructions. For example, the viscoelastic lightguide may be provided in roll or sheet form such that it can be cut into various shapes and sizes. The light source may also be interchangeable with the viscoelastic lightguide, for example, if the light source should become unusable or if a different color of light is desired. Further, if used in a sign construction, graphics can be interchanged, for example, if one would like to update an advertisement.

The optical device may provide many more advantages. The optical device can be used to provide light that is bright, diffuse, uniform and/or concentrated over particular areas. The optical device may provide advantages by being thin, flexible (can be flexed by hand) and/or lightweight, and it may even be conformable to a particular shape and size. The viscoelastic lightguide may be tiled to light large areas which may be made easier if the lightguides can be stuck together. Due to its viscoelastic properties, the viscoelastic lightguide may also dampen stresses experienced by the optical device or construction in which the device is used. The viscoelastic lightguide, when disposed on a substrate, may be removable and/or repositionable over time. The optical device may also provide advantages related to cost, because it can be made from commercially available light sources and viscoelastic materials. Additional advantages are described below.

The optical device disclosed herein comprises a viscoelastic lightguide and a light source. Light is emitted by the light source, enters the viscoelastic lightguide, and propagates, reflects, and/or refracts according to the law of refraction and the principle of total internal reflection. The behavior of light within the viscoelastic lightguide may depend on a variety of factors such as the surface structure of the lightguide, the presence (or absence) of additional substrate(s) in contact with the viscoelastic lightguide, and/or the material compositions of the viscoelastic lightguide and any additional substrate(s) in contact with the viscoelastic lightguide. In addition, the behavior of light within the viscoelastic lightguide may depend on the angular distribution of light that enters the lightguide.

A brief description of the law of refraction and total internal reflection is provided for the convenience of the reader. This brief description forms the basis for understanding the behavior of light with respect to the optical device disclosed herein. For a detailed description of the behavior of light see, for example: "Seeing the Light" by D. S. Falk et al., John Wiley and Sons, Inc., 1986, pp. 53-56.

Figure 1B:
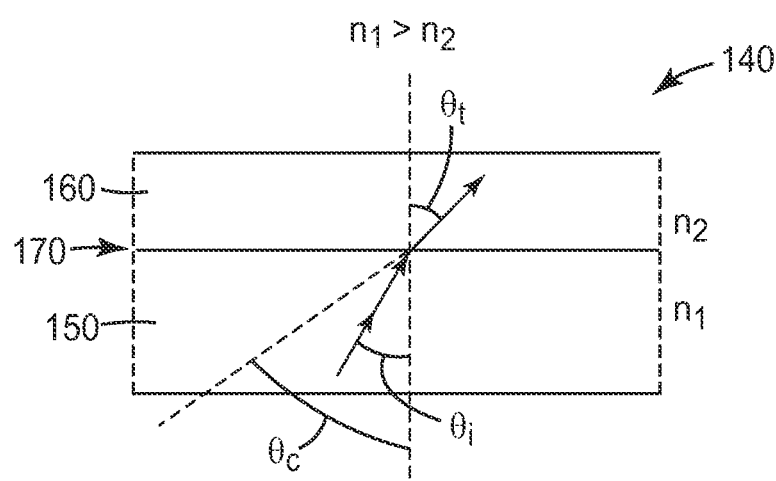

The law of refraction is illustrated in FIGS. 1a and 1b for a given pair of first and second layers. Light (represented by one or more rays for simplicity) propagates within the first layer and strikes the interface between the two layers. The light refracts, at a transmittance angle $\theta_t$, into the second layer according to the law of refraction:

$$\sin \theta_t = (n_1/n_2)(\sin \theta_i)$$

wherein $\theta_i$ is the incident angle, and $n_1$ and $n_2$ are the refractive indices of the first and second layers, respectively.

FIG. 1a shows a pair of layers 100 having first layer 110 and second layer 120 with refractive indices $n_1$ and $n_2$, respectively, such that $n_1 < n_2$. Light propagating within the first layer strikes interface 130 at many different incident angles and refracts into the second layer at angles within the transmittance angles $\theta_t$.

FIG. 1b shows a pair of layers 140 having first layer 150 and second layer 160 with refractive indices $n_1$ and $n_2$, respectively, such that $n_1 > n_2$. Light propagating within the first layer strikes interface 170 at incident angle $\theta_i$ and refracts at transmittance angle $\theta_t$ into the second layer according to the law of refraction. Only light having an incident angle less than or equal to critical angle $\theta_c$ will enter the second layer. All other light incident upon the interface is reflected. The critical angle $\theta_c$ is defined as:

$$\sin \theta_c = n_2/n_1$$

In general, total internal reflection occurs when light having a particular angular component or distribution is incident upon an interface at one or more angles greater than the critical angle $\theta_c$.

Figure 2:
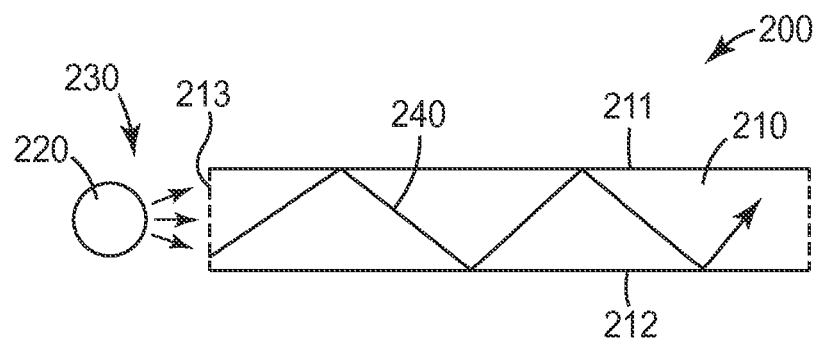
FIG. 2 shows a schematic cross section of an exemplary optical device.

FIG. 2 shows an exemplary optical device 200. Light source 220 is positioned relative to viscoelastic lightguide 210 such that light emitted by the light source enters viscoelastic lightguide 210 and is transported within the layer by total internal reflection. Light emitted by the light source is represented by rays 230 which enter viscoelastic lightguide 210 through input surface 213 adapted to receive light from the light source. Light within the viscoelastic lightguide is represented by single ray 240 which is transported by total internal reflection. At least a portion of the viscoelastic lightguide has an optically smooth surface 211 and/or 212.

An optically smooth surface, as used herein, means that the surface is smooth enough such that light incident upon the surface is not affected undesirably by the surface, e.g., the surface is free of defects having at least one dimension larger than the wavelength of the incident light. The optically smooth surface allows at least some of the light entering the viscoelastic lightguide to be reflected at the surface such that this light continues to propagate within the layer according to the principle of total internal reflection.

In general, light propagating within the viscoelastic lightguide is either reflected or extracted from the lightguide. For reflection of light incident on an optically smooth surface, the observed reflection angle is within about 10° of the calculated reflection angle. Likewise, for refraction of light incident on an optically smooth surface, the observed transmittance angle is within about 10° of the calculated transmittance angle. Total internal reflection occurs if a predetermined amount, or at least within about 10% of a predetermined amount, of light does not escape the viscoelastic lightguide unless it is intentionally extracted from the lightguide.

In general, the surfaces of the viscoelastic lightguide may be unstructured as shown in FIG. 2, or they may have any three-dimensional structure depending on the desired effect. In general, a surface of the viscoelastic lightguide may comprise at least one feature that extends along a portion of the surface and is oriented to extract light from the viscoelastic lightguide. In some embodiments, the at least one feature comprises a plurality of features, the features comprising protrusions, depressions, or a combination thereof. Exemplary features comprise protrusions and/or depressions having lenticular, prismatic, ellipsoidal, conical, parabolic, pyramidal, square, or rectangular shapes, or a combination thereof. Features comprising lenses are particularly useful for directing light to a preferred angular distribution. Exemplary features comprising linear prisms or elongated prisms are also particularly useful. Other exemplary features comprise protrusions and/or depressions having elongated, irregular, variably sloped lenticular, or random columnar shapes, or a combination thereof. Hybrids of any combination of shapes may be used, for example, elongated parabolic, pyramidal prismatic, rectangular-based prismatic, and rounded-tip prismatic shapes. The features may comprise random combinations of shapes.

Sizes of the features may be described by their overall shapes in three dimensions. In some embodiments, each feature may have a dimension of from about 1 to about 100 um, for example, from about 5 to about 70 um. A viscoelastic lightguide may have features that are all the same shape, but the sizes of the shapes may vary in at least one dimension. A viscoelastic lightguide may also have features that are different shapes, and the sizes of these features may or may not vary in any given dimension.

Surface structures of the features may also be varied. Surface structure of a feature generally refers to the substructure of the feature. Exemplary surface structures include optically smooth surfaces, irregular surfaces, patterned surfaces, or a combination thereof. For a viscoelastic lightguide having a plurality of features, each of the features may have the same surface structure. For a viscoelastic lightguide having a plurality of features, some of the features may have the same surface structure. For a viscoelastic lightguide having a plurality of features, each of the features may have a different surface structure. The surface structure of a feature may vary over portions of the feature.

An optically smooth surface of a feature may form part of the optically smooth surface of the viscoelastic lightguide. The optically smooth surfaces of the feature and the viscoelastic lightguide may be continuous or discontinuous with each other. If a plurality of features is used, the surfaces of some extracting features may be completely optically smooth or some may be partially optically smooth. The optically smooth surface may be in contact with an adjacent lightguide or substrate on which the viscoelastic lightguide is disposed.

The number of features, if used, for a given viscoelastic lightguide is at least one. A plurality of features, meaning at least two, may also be used. In general, any number of features may be included, e.g., 0, 1, 2, 3, 4 or 5 features; greater than 1, greater than 10, greater than 20, greater than 30, greater than 40, greater than 50, greater than 100, greater than 200, greater than 500, greater than 1000, or greater than 2000 features; or from about 1 to about 10, from about 1 to about 20, from about 1 to about 30, from about 1 to about 40, from about 1 to about 50, from about 1 to about 100, from about 1 to about 200, from about 1 to about 500, from about 1 to about 1000, or from about 1 to about 2000 features.

The features may be randomly arranged, arranged in some type of regular pattern, or both. The distance between features may also vary. The features may be discreet or they may overlap. The features may be arranged in close proximity to one another, in substantial contact with each other, immediately adjacent each other, or some combination thereof. A useful distance between features is up to about 10 um, or from about 0.05 um to about 10 um. The features may be offset with respect to one another, angularly as well as transversely. The areal density of the features may change over the length, width, or both.

The features may be arranged to obtain a desired optical effect. The features may be arranged to extract light uniformly or as a gradient from the viscoelastic lightguide, to hide discrete light sources, or to reduce Moiré.

The features may be used to control the amount and/or direction of light extracted from the viscoelastic lightguide. This can be carried out generally by varying the shape, size, surface structure, and/or orientation of the features. If a plurality of features is used, then the number and/or arrangement of the features may be varied, as well as the orientation of the features relative to each other.

In general, one may determine theoretically how varying the orientation of each feature can affect the amount and distribution of light that may be extracted from the viscoelastic lightguide. This may be carried out using ray tracing techniques consistent with the law of refraction and the principle of total internal reflection.

The shape of a feature may change the angular component of light which can increase or decrease the amount of light extracted from the viscoelastic lightguide. This may be the case if light propagates by total internal reflection within the viscoelastic lightguide and strikes a surface of a feature at an angle less than, equal to, or greater than the critical angle for the viscoelastic lightguide and air and/or an adjacent substrate(s). The amount of light extracted from the viscoelastic lightguide may increase or decrease accordingly.

The size of a feature may be changed such that more or less light can reflect off a surface of the feature, thus increasing or decreasing the amount of light extracted from the viscoelastic lightguide.

The surface structure of a feature may be used to control the distribution of light that is extracted from the viscoelastic lightguide. Light having a particular angular distribution may strike a feature and be extracted uniformly and/or randomly from the viscoelastic lightguide. Light may also be extracted uniformly and in a pattern, or randomly and in a pattern.

Figure 3A:
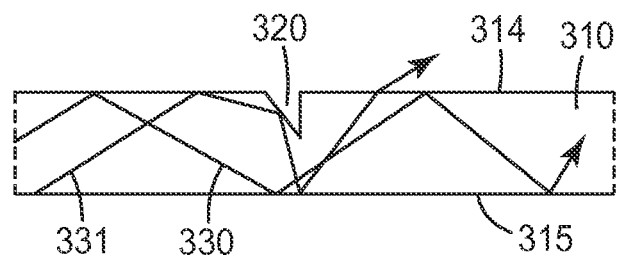
FIGS. 3a-3b, 4a-4b, 5a-5c and 6a-6b show schematic cross sections of exemplary viscoelastic lightguides.

FIG. 3a shows a schematic cross section of exemplary viscoelastic lightguide 310 comprising feature 320. In this example, the feature is a notch-like depression of surface 311. Surfaces 311 and 312 are optically smooth surfaces. The surfaces of feature 320 are optically smooth surfaces. Exemplary behavior of light within viscoelastic lightguide 310 is shown by rays 330 and 331. Light represented by ray 330 propagates by total internal reflection within viscoelastic lightguide 310. Light represented by ray 331 propagates by total internal reflection within viscoelastic lightguide 310 and eventually strikes a surface of feature 320. As a result, the angular component of ray 331 is changed, and light represented by this ray can strike surface 312 at an angle less than the critical angle such that the light is extracted from viscoelastic lightguide 310. Thus, as exemplified in FIG. 3a, the amount of light extracted from the viscoelastic lightguide may be increased. The direction in which light may be extracted from the viscoelastic lightguide may be varied by changing the orientation of feature 320 such that the angle at which ray 331 strikes the feature is increased or decreased but remains less than or equal to the critical angle.

Figure 3B:
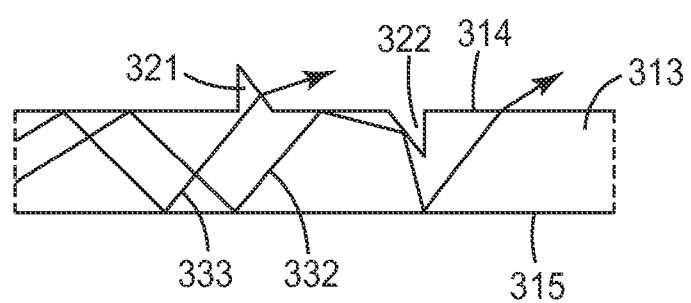

FIG. 3b shows a schematic cross section of exemplary viscoelastic lightguide 313 comprising features 321 and 322. In this example, the features are notch-like features with one being a protrusion of surface 314 and the other a depression. Surfaces 314 and 315 are optically smooth surfaces. The surfaces of features 321 and 322 are optically smooth surfaces. Exemplary behavior of light within viscoelastic lightguide 313 is shown by rays 332 and 333. Light represented by ray 332 propagates by total internal reflection within viscoelastic lightguide 313 and eventually strikes a surface of feature 322. As a result, the angular component of ray 332 is changed, and light represented by this ray can strike surface 314 at an angle less than the critical angle such that the light is extracted from viscoelastic lightguide 313. Light represented by ray 333 propagates by total internal reflection within viscoelastic lightguide 313 and eventually strikes a surface of feature 321. As a result, the angular component of ray 333 is changed, and light represented by this ray can strike surface 314 at an angle less than the critical angle such that the light is extracted from viscoelastic lightguide 313. Thus, as exemplified in FIG. 3b, the amount of light extracted from the viscoelastic lightguide may be increased, and the direction(s) in which light may be extracted from the viscoelastic lightguide may be varied by changing the orientation of the feature(s).

Figure 4A:
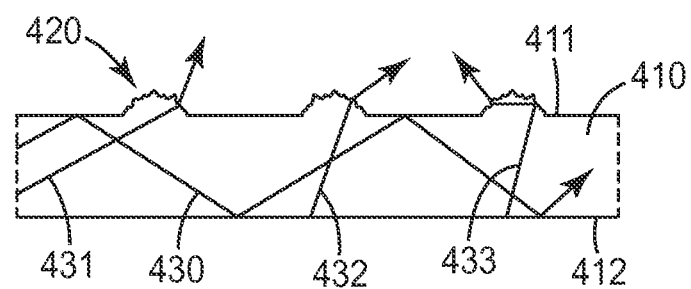

FIG. 4a shows a schematic cross section of exemplary viscoelastic lightguide 410 comprising features 420 that protrude from surface 411. Each of the features 420 has an overall hemispherical shape with an irregular surface for diffusing light. Surface 411 is optically smooth and includes the surface around each of the features and is generally continuous. Thus, the surfaces of features 420 are not part of the optically smooth surface 411. Surface 412 is optically smooth. Exemplary behavior of light within viscoelastic lightguide 410 is shown by rays 430-433. Light represented by ray 430 propagates by total internal reflection within viscoelastic lightguide 410. Light represented by rays 431-433, having different angular components, propagates within the viscoelastic lightguide and strikes features 420. Light represented by rays 431 and 432 is extracted from viscoelastic lightguide 410 because both rays strike surfaces of features 420 at angles less than that of the critical angle. Light represented by ray 433, having an angular component different from that of rays 431 and 432, reflects at the surface of feature 420 because the incident angle is greater than the critical angle. The reflected light strikes the surface of the feature again, this time at an angle less than the critical angle, and the light is extracted from viscoelastic lightguide 410.

Figure 4B:
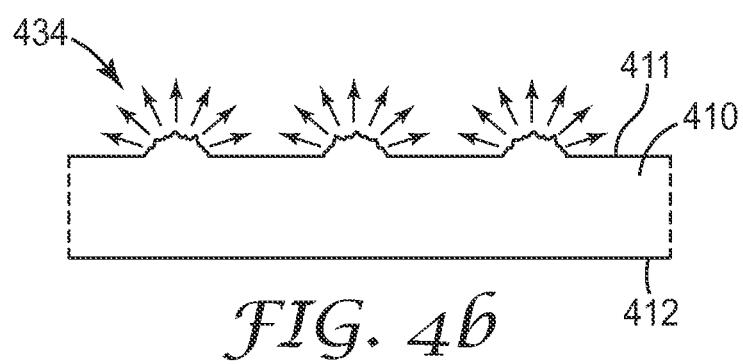

FIG. 4b shows the schematic cross section of exemplary viscoelastic lightguide 410. Light (not shown) having a wide angular distribution propagates within viscoelastic lightguide 410 such that it is extracted diffusely from the lightguide as represented by rays 434.

Figure 5A:
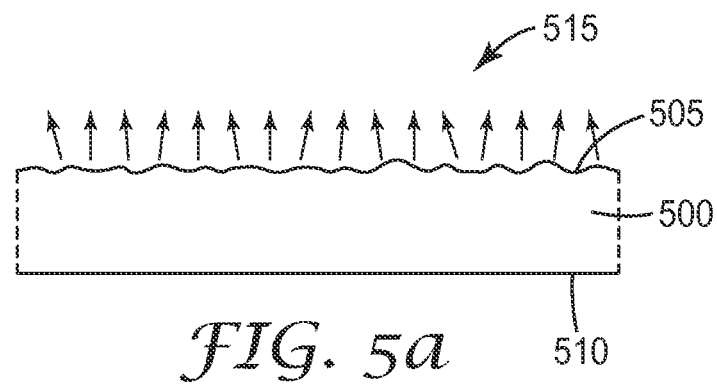
Figure 5B:
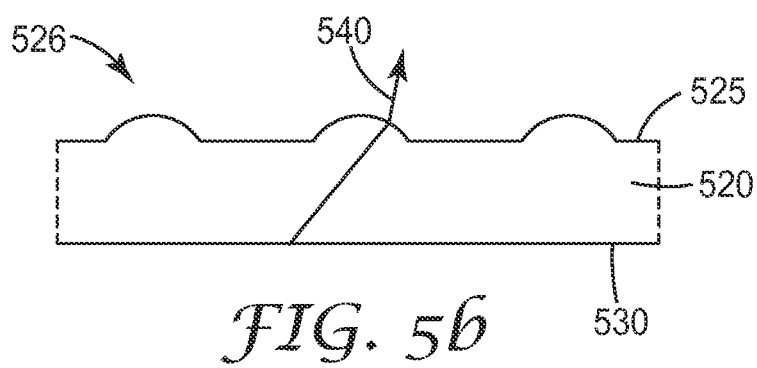
Figure 5C:
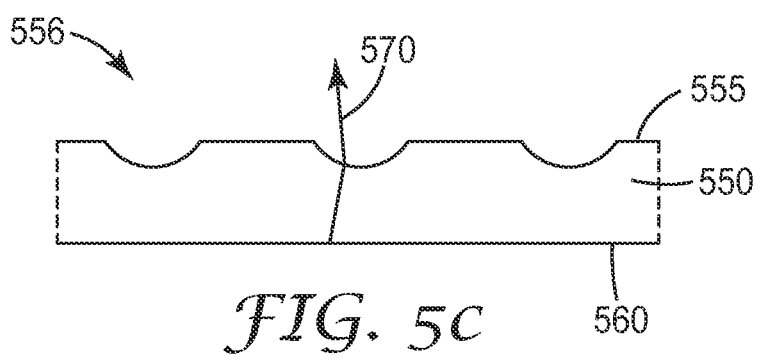

FIGS. 5a-5c show schematic cross sections of exemplary viscoelastic lightguides that may be used. In FIG. 5a, viscoelastic lightguide 500 comprises surface 505 which is irregular such that light represented by rays 515 is diffused upon being extracted from the viscoelastic lightguide. Viscoelastic lightguide 500 also comprises opposing surface 510 which may be an optically smooth surface, a non-optically smooth surface, or a partially optically smooth surface. In FIG. 5b, viscoelastic lightguide 520 comprises optically smooth surface 525 which includes the optically smooth surfaces of features 526. The features comprise discreet convex lenticular features such that light represented by ray 540 is extracted from the viscoelastic lightguide at a predetermined direction. Viscoelastic lightguide 520 also comprises opposing surface 530 which may be an optically smooth surface, a non-optically smooth surface, or a partially optically smooth surface. In FIG. 5c, viscoelastic lightguide 550 comprises optically smooth surface 555 which includes the optically smooth surfaces of features 556. The features comprise discreet concave lenticular features such that light represented by ray 570 is emitted from the viscoelastic lightguide at a predetermined direction. Viscoelastic lightguide 550 also comprises opposing surface 560 which may be an optically smooth surface, a non-optically smooth surface, or a partially optically smooth surface.

Figure 6A:
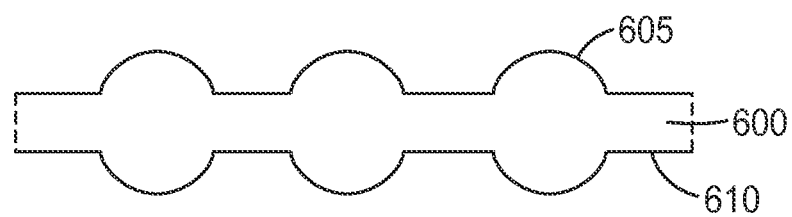
Figure 6B:
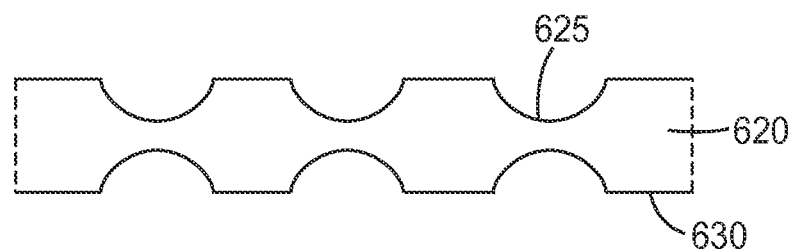

The viscoelastic lightguide may have opposing surfaces that are configured dependently or independently relative to each other. FIG. 6a shows a schematic cross section of viscoelastic lightguide 600 comprising optically smooth surfaces 605 and 610, each surface including individual convex lenticular features. The features of each surface can be aligned or nearly aligned with each other, or at least within about 100 um. FIG. 6b shows a schematic cross section of viscoelastic lightguide 620 comprising optically smooth surfaces 625 and 630, each surface including individual concave lenticular features. The features of each surface can be aligned or nearly aligned with each other, or at least within about 100 um.

Exemplary features are described in U.S. Pat. No. 6,379,016 B1 (Boyd et al.); U.S. Pat. No. 7,046,905 B1 (Gardiner et al.); US 2003/0034445 A1 (Boyd et al.); US 2007/0047254 A1 (Gardiner et al.); US 2008/232135 A1 (Kinder et al.); and US 2009/0067151 (Sahlin, et al.).

The amount and direction of light extracted from the viscoelastic lightguide may be controlled, at the very least, by the shape, size, number, arrangement, etc. of the features. In general, the viscoelastic lightguide can be designed such that light may be extracted from the lightguide in at least one predetermined direction, e.g., 1, 2, 3, 4, 5, 6, 7, 8, 9, 10, or more predetermined directions; from 1 to about 3 predetermined directions; from 1 to about 5 predetermined directions; from 1 to about 10 predetermined directions; or from 1 to about 100 predetermined directions. The light extracted in at least one predetermined direction may be extracted in a pattern. The light extracted in at least one predetermined direction may be extracted uniformly (at the same or nearly the same intensity) or non-uniformly from the viscoelastic lightguide. Light may also be extracted in random directions from the viscoelastic lightguide and/or at various random intensities from the lightguide.

Figure 7:
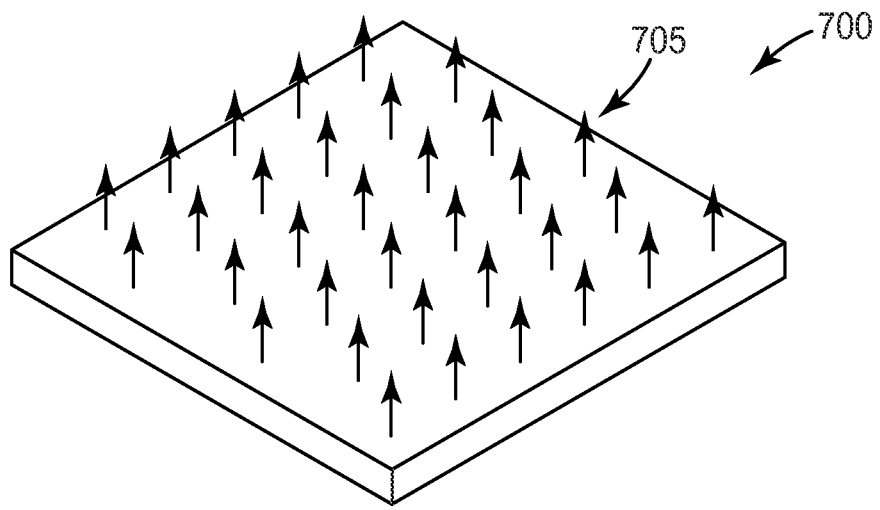
FIGS. 7-12 show schematic perspective views of exemplary viscoelastic lightguides.
Figure 8:
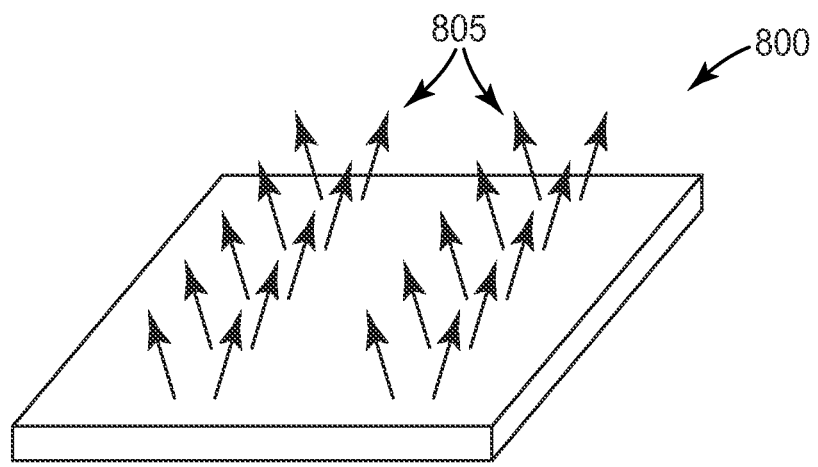
Figure 9:
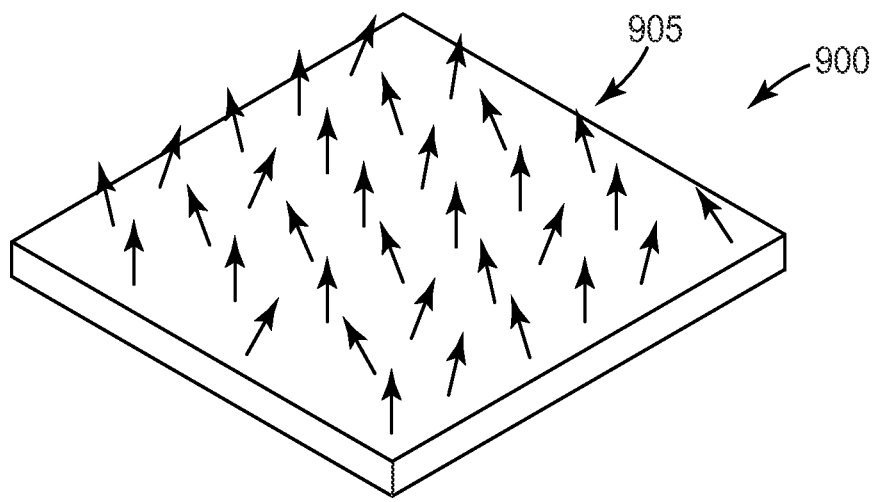

FIGS. 7-11 show perspective views of exemplary viscoelastic lightguides and how light may be extracted therefrom. The viscoelastic lightguides shown in FIGS. 7-11 are depicted generically as sheets having square to rectangular shapes. Many other three-dimensional shapes are contemplated as described below. FIG. 7 shows a perspective view of exemplary viscoelastic lightguide 700 wherein light represented by rays 705 is extracted in a predetermined direction from the lightguide. FIG. 8 shows a perspective view of exemplary viscoelastic lightguide 800 wherein light represented by rays 805 is extracted in two predetermined directions from the lightguide. Light represented by rays 805 is also extracted in a pattern. FIG. 9 shows a perspective view of exemplary viscoelastic lightguide 900 wherein light represented by rays 905 is extracted randomly from the lightguide.

Figure 10:
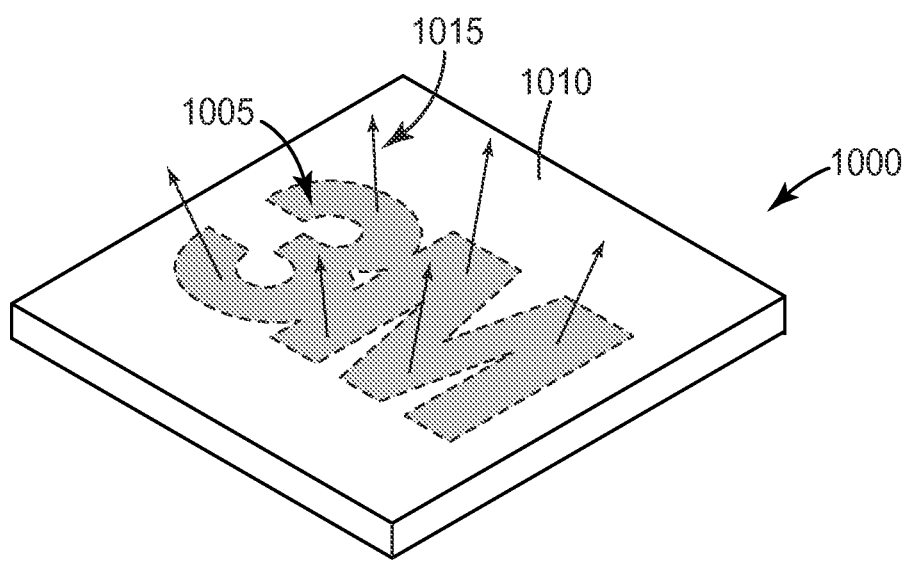

FIG. 10 shows a perspective view of exemplary viscoelastic lightguide 1000. Predetermined shape 1005 is shown by a dotted line and shaded area of surface 1010 of the lightguide. Light represented by rays 1015 is extracted from viscoelastic lightguide 1000 such that the predetermined shape is illuminated. In general, the predetermined shape may comprise one or more discrete areas of the viscoelastic lightguide. Light may be extracted from one or more discrete areas of the viscoelastic lightguide, e.g., 1, 2, 3, 4, 5, 6, 7, 8, 9, 10, or more discrete areas, or from 1 to about 5 discrete areas, from 1 to about 50 discrete areas, or from 1 to about 500 discrete areas.

Figure 11:
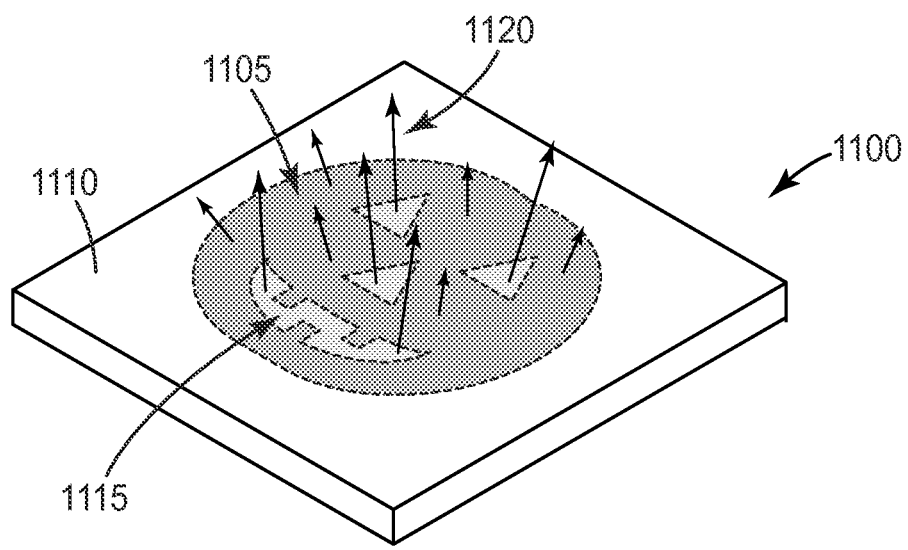

FIG. 11 shows a perspective view of exemplary viscoelastic lightguide 1100. Predetermined shape 1105 is shown by a dotted line and shaded area of surface 1110. Predetermined shapes 1115 within predetermined shape 1105 are shown by dotted lines and lightly shaded areas. Light represented by rays 1120 is extracted at different intensities such that light extracted from predetermined shapes 1115 is extracted at a higher intensity as compared to light extracted from predetermined shape 1105. In this way, predetermined shape 1105 is illuminated and predetermined shapes 1115 are illuminated at higher intensities.

Figure 12:
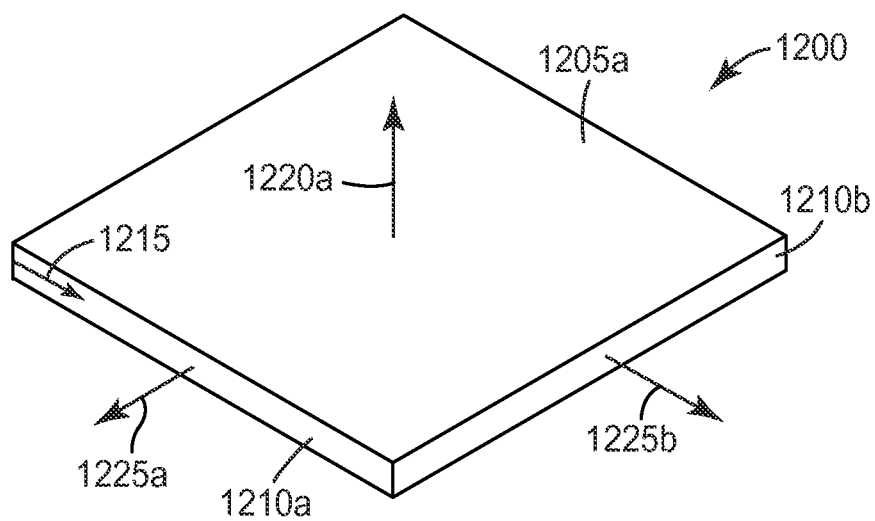

In the examples presented so far, light is shown as being extracted from a surface of the viscoelastic lightguide that is generally perpendicular to the input surface, from opposing surfaces of the lightguide that are generally perpendicular to the input surface, or from a surface that is a major surface of the lightguide. Light may also be extracted from other surfaces of the viscoelastic lightguide. FIG. 12 illustrates how light may be extracted from an exemplary viscoelastic lightguide shaped as a film or sheet. FIG. 12 shows a perspective view of exemplary viscoelastic lightguide 1200 comprising opposing major surfaces 1205a and 1205b (not shown) and edge surfaces 1225a, 1225b, and 1225c (not shown). In general, light may be extracted from one or some combination of surfaces 1205a, 1205b, or 1225a-c. For example, light may be extracted only from major surface 1205a as shown by ray 1220a. For another example, light may be extracted only from edge surface 1225b. Light which enters the viscoelastic lightguide is shown by ray 1215.

Figure 13:
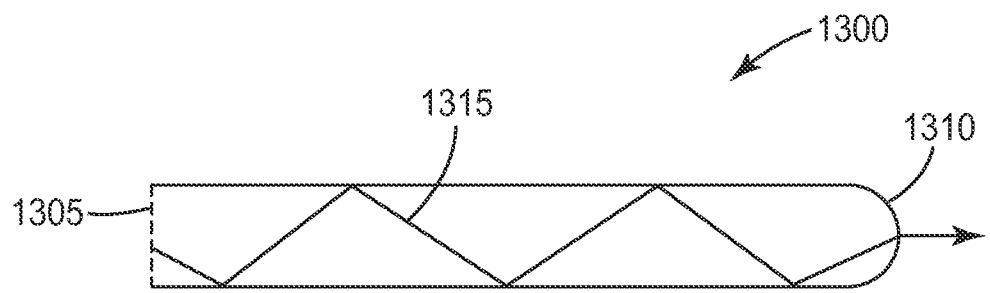
FIG. 13 shows a schematic cross section of an exemplary viscoelastic lightguide.

FIG. 13 shows a schematic cross section of exemplary viscoelastic lightguide 1300 comprising input edge 1305 and opposing edge surface 1310 having a lenticular surface for directing light in one or more predetermined directions. Light emitted by a light source (not shown) and represented by ray 1315 enters the lightguide (at a first surface) and is transported by total internal reflection within the lightguide until it is extracted from opposing edge surface 1310 (opposing second surface). Light emitted by a light source may also enter the viscoelastic lightguide at a first surface of the lightguide and be extracted at a second surface, wherein the first and second surfaces are from about 45 to about 135° relative to each other.

In some embodiments, a surface of the viscoelastic lightguide is microstructured to form air release channels. As used herein, microstructured refers to a surface having one or more features that are microscopic (from about 1 to about 100 um) in at least one dimension. These channels can facilitate air egress so that few air bubbles remain trapped between a viscoelastic lightguide and a substrate. The microstructured surface with air release channels is may be useful with a viscoelastic lightguide that comprises a PSA. For example, a PSA viscoelastic lightguide may have a composition and/or surface structure the same or nearly the same as the CONTROLTAC products available from 3M Company. In this way, a user can dispose the viscoelastic lightguide and substrate in some initial position and slide the two relative to each other such that desired positioning is obtained. The microstructure of the microstructured surface may remain and/or change over time.

The microstructured surface with air release channels may comprise a variety of shapes including hemispheres, prisms (such as square prisms, rectangular prisms, cylindrical prisms and other similar polygonal features), pyramids, ellipses, grooves (e.g., V-grooves), channels, and the like. Grooves and channels may or may not extend to the edge of a predetermined area. Another exemplary microstructured surface is described in US 2007/0292650 A1 (Suzuki) wherein a microstructured adhesive layer surface has one or more grooves that exist only in an inner area of the surface and are not open at side surfaces of the layer. These grooves may be in the form of a straight line, branched straight lines, cross, circle, oval, or polygon as viewed from above, and where each form may be composed of plural discontinuous grooves. These grooves may have a width of from 5 to 100 micrometers and a depth of from 5 to 50 micrometers.

The viscoelastic lightguide is generally in contact with at least one medium. The medium may comprise air or a substrate, and substrates may be polymeric film, metal, glass, and/or fabric. Particular substrates are described below for a variety of exemplary constructions. For the purpose of convenience, a viscoelastic lightguide in contact with a substrate is described below, but this substrate may comprise any type of medium including air.

The law of refraction and the principle of total internal reflection can be applied as described above to determine the amount of light extracted from the viscoelastic lightguide given a particular substrate directly in contact with the lightguide. For example, given a particular substrate in contact with the viscoelastic lightguide, the amount of light extracted from the lightguide and by the substrate may be less than about 0.5%, less than about 1%, less than about 2%, less than about 5%, less than about 10%, less than about 20%, less than about 30%, less than about 40%, less than about 50%, less than about 60%, less than about 70%, less than about 80%, or less than about 90% relative to the total amount of light that enters the lightguide. For another example, given a particular substrate in contact with the viscoelastic lightguide, the amount of light extracted from the lightguide by the substrate may be greater than about 10%, greater than about 20%, greater than about 30%, greater than about 40%, greater than about 50%, greater than about 60%, greater than about 70%, greater than about 80%, or greater than about 90% relative to the total amount of light that enters the lightguide. For yet another example, given a particular substrate in contact with the viscoelastic lightguide, the amount of light extracted from the lightguide may be from about 10 to about 50%, from about 20 to about 50%, from about 30 to about 50%, from about 50 to about 70%, from about 50 to about 80%, or from about 10 to about 90% relative to the total amount of light that enters the lightguide.

The law of refraction and the principle of total internal reflection can be applied as described above to determine the direction of light extracted from the viscoelastic lightguide given a particular substrate in contact with the lightguide. For example, given a particular substrate in contact with the viscoelastic lightguide, the transmittance angle for light extracted from the viscoelastic lightguide by the substrate may be determined for a given incident angle. For example, the transmittance angle for light extracted from the viscoelastic lightguide by the substrate may be from greater than about 5° to less than about 95°, greater than about 5° to less than about 60°, or greater than about 5° to less than about 30°.

The viscoelastic lightguide may have a refractive index greater than that of the substrate. The refractive index of the viscoelastic lightguide may be greater than about 0.002, greater than about 0.005, greater than about 0.01, greater than about 0.02, greater than about 0.03, greater than about 0.04, greater than about 0.05, greater than about 0.1, greater than about 0.2, greater than about 0.3, greater than about 0.4, or greater than about 0.5, as compared to the refractive index of the substrate.

The viscoelastic lightguide may have a refractive index less than that of the substrate. The refractive index of the viscoelastic lightguide may be less than about 0.002, less than about 0.005, less than about 0.01, less than about 0.02, less than about 0.03, less than about 0.04, less than about 0.05, less than about 0.1, less than about 0.2, less than about 0.3, less than about 0.4, or less than about 0.5, as compared to the refractive index of the substrate.

The viscoelastic lightguide and the substrate may have the same or nearly the same refractive index such that light can be extracted into the substrate with little or no change to the light. The refractive index difference of the viscoelastic lightguide and the substrate may be from about 0.001 to less than about 0.002.

The refractive index difference of the viscoelastic lightguide and the substrate may be from about 0.002 to about 0.5, from about 0.005 to about 0.5, from about 0.01 to about 0.5, from about 0.02 to about 0.5, from about 0.03 to about 0.5, from about 0.04 to about 0.5, from about 0.05 to about 0.5, from about 0.1 to about 0.5, from about 0.2 to about 0.5, from about 0.3 to about 0.5, or from about 0.4 to about 0.5.

The viscoelastic lightguide may have any bulk three-dimensional shape as is needed for a given application. The viscoelastic lightguide may be in the form of a square or rectangular layer, sheet, film, etc. as shown in FIGS. 7-11. The viscoelastic lightguide may be cut or divided into shapes as described below. The viscoelastic lightguide may also be tapered such that it is thicker at one end as compared to an opposing end; tapered shapes are sometimes referred to as wedges or pseudo-wedges as described in the Boyd et al., Gardiner et al., Kinder et al., and Sahlin et al. references cited above.

The thickness of the viscoelastic lightguide is not particularly limited as long as it can function as desired. The thickness of the viscoelastic lightguide may be selected based on or in conjunction with the light source. For example, design parameters may limit or even require that a particular light source(s) be used, and there may be a minimum amount, or range of amounts, of light that is required to enter the viscoelastic lightguide. Thus, the thickness of the viscoelastic lightguide may be selected so that the required amount of light from a given light source can enter the lightguide. A maximum thickness of the viscoelastic lightguide may be required for use in optical devices designed to be particularly thin. Exemplary thicknesses for the viscoelastic lightguide range from about 0.4 mil to about 1000 mil, from about 1 mil to about 300 mil, from about 1 mil to about 60 mil, or from about 0.5 mil to about 30 mil.

The amount and direction of light extracted from the viscoelastic lightguide may be controlled, at the very least, by the shape, size, number, arrangement, etc. of the features, the refractive indices of the viscoelastic lightguide and any optional substrate(s), the shape and size of the viscoelastic lightguide, and the angular distribution of light that is allowed to enter the viscoelastic lightguide. These variables may be selected such that less than about 0.5%, less than about 1%, less than about 2%, less than about 5%, less than about 10%, less than about 20%, less than about 30%, less than about 40%, less than about 50%, less than about 60%, less than about 70%, less than about 80%, or less than about 90% of light is extracted from the viscoelastic lightguide relative to the total amount of light that enters the lightguide. These variables may be selected such that greater than about 10%, greater than about 20%, greater than about 30%, greater than about 40%, greater than about 50%, greater than about 60%, greater than about 70%, greater than about 80%, or greater than about 90% of light is extracted from the viscoelastic lightguide relative to the total amount of light that enters the lightguide. These variables may be selected such that from about 10 to about 50%, from about 20 to about 50%, from about 30 to about 50%, from about 50 to about 70%, from about 50 to about 80%, or from about 10 to about 90% of light is extracted from the viscoelastic lightguide relative to the total amount of light that enters the lightguide.

The viscoelastic lightguide comprises one or more viscoelastic materials. In general, viscoelastic materials exhibit both elastic and viscous behavior when undergoing deformation. Elastic characteristics refer to the ability of a material to return to its original shape after a transient load is removed. One measure of elasticity for a material is referred to as the tensile set value which is a function of the elongation remaining after the material has been stretched and subsequently allowed to recover (destretch) under the same conditions by which it was stretched. If a material has a tensile set value of 0%, then it has returned to its original length upon relaxation, whereas if the tensile set value is 100%, then the material is twice its original length upon relaxation. Tensile set values may be measured using ASTM D412. Useful viscoelastic materials may have tensile set values of greater than about 10%, greater than about 30%, or greater than about 50%; or from about 5 to about 70%, from about 10 to about 70%, from about 30 to about 70%, or from about 10 to about 60%.

Viscous materials that are Newtonian liquids have viscous characteristics that obey Newton's law which states that stress increases linearly with shear gradient. A liquid does not recover its shape as the shear gradient is removed. Viscous characteristics of useful viscoelastic materials include flowability of the material under reasonable temperatures such that the material does not decompose.

The viscoelastic lightguide may have properties that facilitate sufficient contact or wetting with at least a portion of a substrate such that the viscoelastic lightguide and the substrate are optically coupled. Light can then be extracted out of the viscoelastic lightguide and into the substrate. The viscoelastic lightguide is generally soft, compliant and flexible. Thus, the viscoelastic lightguide may have an elastic modulus (or storage modulus G') such that sufficient contact can be obtained, and a viscous modulus (or loss modulus G") such that the layer doesn't flow undesirably, and a damping coefficient (G"/G', tan D) for the relative degree of damping of the layer.

Useful viscoelastic materials may have a storage modulus, G', of less than about 300,000 Pa, measured at 10 rad/sec and a temperature of from about 20 to about 22° C. Useful viscoelastic materials may have a storage modulus, G', of from about 30 to about 300,000 Pa, measured at 10 rad/sec and a temperature of from about 20 to about 22° C. Useful viscoelastic materials may have a storage modulus, G', of from about 30 to about 150,000 Pa, measured at 10 rad/sec and a temperature of from about 20 to about 22° C. Useful viscoelastic materials may have a storage modulus, G', of from about 30 to about 30,000 Pa, measured at 10 rad/sec and a temperature of from about 20 to about 22° C. Useful viscoelastic materials may have a storage modulus, G', of from about 30 to about 150,000 Pa, measured at 10 rad/sec and a temperature of from about 20 to about 22° C., and a loss tangent (tan d) of from about 0.4 to about 3. Viscoelastic properties of materials can be measured using Dynamic Mechanical Analysis according to, for example, ASTM D4065, D4440, and D5279.

In some embodiments, the viscoelastic lightguide comprises a PSA layer as described in the Dalquist criterion line (as described in Handbook of Pressure Sensitive Adhesive Technology, Second Ed., D. Satas, ed., Van Nostrand Reinhold, New York, 1989.)

The viscoelastic lightguide may have a particular peel force or at least exhibit a peel force within a particular range. For example, the viscoelastic lightguide may have a 90° peel force of from about 50 to about 3000 g/in, from about 300 to about 3000 g/in, or from about 500 to about 3000 g/in. Peel force may be measured using a peel tester from IMASS.

In some embodiments, the viscoelastic lightguide comprises an optically clear lightguide having high light transmittance of from about 80 to about 100%, from about 90 to about 100%, from about 95 to about 100%, or from about 98 to about 100% over at least a portion of the visible light spectrum (about 400 to about 700 nm). In some embodiments, the viscoelastic lightguide has a haze value of less than about 5%, less than about 3%, or less than about 1%. In some embodiments, the viscoelastic lightguide has a haze value of from about 0.01 to less than about 5%, from about 0.01 to less than about 3%, or from about 0.01 to less than about 1%. Haze values in transmission can be determined using a haze meter according to ASTM D1003.

In some embodiments, the viscoelastic lightguide comprises an optically clear lightguide having high light transmittance and a low haze value. High light transmittance may be from about 90 to about 100%, from about 95 to about 100%, or from about 99 to about 100% over at least a portion of the visible light spectrum (about 400 to about 700 nm), and haze values may be from about 0.01 to less than about 5%, from about 0.01 to less than about 3%, or from about 0.01 to less than about 1%. The viscoelastic lightguide may also have a light transmittance of from about 50 to about 100%.

In some embodiments, the viscoelastic lightguide is hazy and diffuses light, particularly visible light. A hazy viscoelastic lightguide may have a haze value of greater than about 5%, greater than about 20%, or greater than about 50%. A hazy viscoelastic lightguide may have a haze value of from about 5 to about 90%, from about 5 to about 50%, or from about 20 to about 50%.

In some embodiments, the viscoelastic lightguide may be translucent in that it reflects and transmits light.

The viscoelastic lightguide may have a refractive index in the range of from about 1.3 to about 2.6, 1.4 to about 1.7, or from about 1.5 to about 1.7. The particular refractive index or range of refractive indices selected for the viscoelastic lightguide may depend on the overall design of the optical device, e.g., the presence or absence of substrates in contact with the lightguide and the particular application in which the device may be used.

The viscoelastic lightguide generally comprises at least one polymer. The viscoelastic lightguide may comprise at least one PSA. PSAs are useful for adhering together adherends and exhibit properties such as: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process. A quantitative description of PSAs can be found in the Dahlquist reference cited above.

Useful PSAs include those based on natural rubbers, synthetic rubbers, styrene block copolymers, (meth)acrylic block copolymers, polyvinyl ethers, polyolefins, and poly (meth)acrylates. As used herein, (meth)acrylic refers to both acrylic and methacrylic species and likewise for (meth) acrylate.

Useful PSAs include (meth)acrylates, rubbers, thermoplastic elastomers, silicones, urethanes, and combinations thereof. In some embodiments, the PSA is based on a (meth)acrylic PSA or at least one poly(meth)acrylate. Herein, (meth)acrylate refers to both acrylate and methacrylate groups. Particularly preferred poly(meth)acrylates are derived from: (A) at least one monoethylenically unsaturated alkyl (meth)acrylate monomer; and (B) at least one monoethylenically unsaturated free-radically copolymerizable reinforcing monomer. The reinforcing monomer has a homopolymer glass transition temperature (Tg) higher than that of the alkyl (meth)acrylate monomer and is one that increases the Tg and cohesive strength of the resultant copolymer. Herein, "copolymer" refers to polymers containing two or more different monomers, including terpolymers, tetrapolymers, etc.

Monomer A, which is a monoethylenically unsaturated alkyl (meth)acrylate, contributes to the flexibility and tack of the copolymer. Preferably, monomer A has a homopolymer Tg of no greater than about 0° C. Preferably, the alkyl group of the (meth)acrylate has an average of about 4 to about 20 carbon atoms, and more preferably, an average of about 4 to about 14 carbon atoms. The alkyl group can optionally contain oxygen atoms in the chain thereby forming ethers or alkoxy ethers, for example. Examples of monomer A include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Benzyl acrylate may also be used. Other examples include, but are not limited to, poly-ethoxylated or -propoxylated methoxy (meth)acrylates such as acrylates of the CARBOWAX product (commercially available from Union Carbide) and NK ester AM90G (commercially available from Shin Nakamura Chemical, Ltd., Japan). Preferred monoethylenically unsaturated (meth)acrylates that can be used as monomer A include isooctyl acrylate, 2-ethyl-hexyl acrylate, and n-butyl acrylate. Combinations of various monomers categorized as an A monomer can be used to make the copolymer.

Monomer B, which is a monoethylenically unsaturated free-radically copolymerizable reinforcing monomer, increases the Tg and cohesive strength of the copolymer. Preferably, monomer B has a homopolymer Tg of at least about 10° C., for example, from about 10 to about 50° C. More preferably, monomer B is a reinforcing (meth)acrylic monomer, including an acrylic acid, a methacrylic acid, an acrylamide, or a (meth)acrylate. Examples of monomer B include, but are not limited to, acrylamides, such as acrylamide, methacrylamide, N-methyl acrylamide, N-ethyl acrylamide, N-hydroxyethyl acrylamide, diacetone acrylamide, N,N-dimethyl acrylamide, N, N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, and N-octyl acrylamide. Other examples of monomer B include itaconic acid, crotonic acid, maleic acid, fumaric acid, 2,2-(diethoxy) ethyl acrylate, 2-hydroxyethyl acrylate or methacrylate, 3-hydroxypropyl acrylate or methacrylate, methyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, and N-vinyl caprolactam. Preferred reinforcing acrylic monomers that can be used as monomer B include acrylic acid and acrylamide. Combinations of various reinforcing monoethylenically unsaturated monomers categorized as a B monomer can be used to make the copolymer.

In some embodiments, the (meth)acrylate copolymer is formulated to have a resultant Tg of less than about 0° C. and more preferably, less than about −10° C. Such (meth) acrylate copolymers preferably include about 60 to about 98% by weight of at least one monomer A and about 2 to about 40% by weight of at least one monomer B, both relative to the total weight of the (meth)acrylate copolymer. Preferably, the (meth)acrylate copolymer has about 85 to about 98% by weight of at least one monomer A and about 2 to about 15% by weight of at least one monomer B, both relative to the total weight of the (meth)acrylate copolymer.

Useful rubber-based PSAs are generally of two classes, natural rubber-based or synthetic rubber-based. Useful natural rubber-based PSAs generally contain masticated natural rubber, for example, from about 20 to about 75% by weight of one or more tackifying resins, from about 25 to about 80% by weight of natural rubber, and typically from about 0.5 to about 2.0% by weight of one or more antioxidants, all relative to the total weight of the masticated rubber. Natural rubber may range in grade from a light pale crepe grade to a darker ribbed smoked sheet and includes such examples as CV-60, a controlled viscosity rubber grade and SMR-5, a ribbed smoked sheet rubber grade. Tackifying resins used with natural rubbers generally include but are not limited to wood rosin and its hydrogenated derivatives; terpene resins of various softening points, and petroleum-based resins, such as, the ESCOREZ 1300 series of C5 aliphatic olefin-derived resins from Exxon.

Antioxidants may be used with natural rubbers in order to retard oxidative attack on the rubber which can result in loss of cohesive strength of the adhesive. Useful antioxidants include but are not limited to amines, such as N—N' di-beta-naphthyl-1,4-phenylenediamine, available as AGERITE Resin D from R.T. Vanderbilt Co., Inc.; phenolics, such as 2,5-di-(t-amyl) hydroquinone, available as SANTOVAR A, available from Monsanto Chemical Co.; tetrakis[methylene 3-(3',5'-di-tert-butyl-4'-hydroxyphenyl) propianate]methane, available as IRGANOX 1010 from Ciba-Geigy Corp.; 2,2'-methylenebis(4-methyl-6-tert butyl phenol), known as Antioxidant 2246; and dithiocarbamates, such as zinc dithiodibutyl carbamate. Curing agents may be used to at least partially vulcanize (crosslink) the PSA.

Useful synthetic rubber-based PSAs include adhesives that are generally rubbery elastomers, which are either self-tacky or non-tacky and require tackifiers. Self-tacky synthetic rubber PSAs include, for example, butyl rubber, a copolymer of isobutylene with less than 3 percent isoprene, polyisobutylene, a homopolymer of isoprene, polybutadiene, or styrene/butadiene rubber. Butyl rubber PSAs often contain an antioxidant such as zinc dibutyl dithiocarbamate. Polyisobutylene PSAs do not usually contain antioxidants. Synthetic rubber PSAs, which generally require tackifiers, are also generally easier to melt process as compared to natural rubber PSAs which typically having very high molecular weights. They comprise polybutadiene or styrene/butadiene rubber, from 10 parts to 200 parts of a tackifier, and generally from 0.5 to 2.0 parts per 100 parts rubber of an antioxidant such as IRGANOX 1010. An example of a synthetic rubber is AMERIPOL 101 1A, a styrene/butadiene rubber available from BF Goodrich.

Tackifiers that may be used with synthetic rubber PSAs include derivatives of rosins such as FORAL 85, a stabilized rosin ester from Hercules, Inc.; the SNOWTACK series of gum rosins from Tenneco; the AQUATAC series of tall oil rosins from Sylvachem; synthetic hydrocarbon resins such as the PICCOLYTE A series, polyterpenes from Hercules, Inc.; the ESCOREZ 1300 series of C5 aliphatic olefin-derived resins; and the ESCOREZ 2000 Series of C9 aromatic/aliphatic olefin-derived resins. Curing agents may be added to at least partially vulcanize (crosslink) the PSA.

Useful thermoplastic elastomer PSAs include styrene block copolymer PSAs which generally comprise elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer PSAs include linear, radial, star and tapered styrene-isoprene block copolymers such as KRATON D1107P, available from Shell Chemical Co., and EUROPRENE SOL TE 9110, available from EniChem Elastomers Americas, Inc.; linear styrene-(ethylene-butylene) block copolymers such as KRATON G1657, available from Shell Chemical Co.; linear styrene-(ethylene-propylene) block copolymers such as KRATON G1750X, available from Shell Chemical Co.; and linear, radial, and star styrene-butadiene block copolymers such as KRATON D1118X, available from Shell Chemical Co., and EUROPRENE SOL TE 6205, available from EniChem Elastomers Americas, Inc. The polystyrene blocks tend to form domains in the shape of spheroids, cylinders, or plates that causes the block copolymer PSAs to have two phase structures.

Resins that associate with the rubber phase may be used with thermoplastic elastomer PSAs if the elastomer itself is not tacky enough. Examples of rubber phase associating resins include aliphatic olefin-derived resins, such as the ESCOREZ 1300 series and the WINGTACK series, available from Goodyear; rosin esters, such as the FORAL series and the STAYBELITE Ester 10, both available from Hercules, Inc.; hydrogenated hydrocarbons, such as the ESCOREZ 5000 series, available from Exxon; polyterpenes, such as the PICCOLYTE A series; and terpene phenolic resins derived from petroleum or terpentine sources, such as PICCOFYN A100, available from Hercules, Inc.

Resins that associate with the thermoplastic phase may be used with thermoplastic elastomer PSAs if the elastomer is not stiff enough. Thermoplastic phase associating resins include polyaromatics, such as the PICCO 6000 series of aromatic hydrocarbon resins, available from Hercules, Inc.; coumarone-indene resins, such as the CUMAR series, available from Neville; and other high-solubility parameter resins derived from coal tar or petroleum and having softening points above about 85° C., such as the AMOCO 18 series of alphamethyl styrene resins, available from Amoco, PICCO-VAR 130 alkyl aromatic polyindene resin, available from Hercules, Inc., and the PICCOTEX series of alphamethyl styrene/vinyl toluene resins, available from Hercules.

Useful silicone PSAs include polydiorganosiloxanes and polydiorganosiloxane polyoxamides. Useful silicone PSAs include silicone-containing resins formed from a hyrosilylation reaction between one or more components having silicon-bonded hydrogen and aliphatic unsaturation. Examples of silicon-bonded hydrogen components include high molecular weight polydimethylsiloxane or polydimethyldiphenylsiloxane, and that contain residual silanol functionality (SiOH) on the ends of the polymer chain. Examples of aliphatic unsaturation components include siloxanes functionalized with two or more (meth)acrylate groups or block copolymers comprising polydiorganosiloxane soft segments and urea terminated hard segments. Hydrosilylation may be carried out using platinum catalysts.

Useful silicone PSAs may comprise a polymer or gum and an optional tackifying resin. The tackifying resin is generally a three-dimensional silicate structure that is end-capped with trimethylsiloxy groups (OSiMe$_3$) and also contains some residual silanol functionality. Examples of tackifying resins include SR 545, from General Electric Co., Silicone Resins Division, Waterford, N.Y., and MQD-32-2 from Shin-Etsu Silicones of America, Inc., Torrance, Calif.

Manufacture of typical silicone PSAs is described in U.S. Pat. No. 2,736,721 (Dexter). Manufacture of silicone urea block copolymer PSAs is described in U.S. Pat. No. 5,214,119 (Leir, et al).

Useful silicone PSAs may also comprise a polydiorganosiloxane polyoxamide and an optional tackifier as described in U.S. Pat. No. 7,361,474 (Sherman et al.). For example, the polydiorganosiloxane polyoxamide may comprise at least two repeat units of Formula I:

indicates a site of attachment of the repeat unit to another group in the copolymer. The copolymer may have a first repeat unit where p is equal to 1 and a second repeat unit where p is at least 2. G may comprise an alkylene, heteroalkylene, arylene, aralkylene, polydiorganosiloxane, or a combination thereof. The integer n may be an integer of 40 to 500. These polydiorganosiloxane polyoxamides can be used in combination with a tackifier. Useful tackifiers include silicone tackifying resins as described in U.S. Pat. No. 7,090,922 B2 (Zhou et al.). Some of these silicone-containing PSAs may be heat activated.

The PSA may be crosslinked to the extent that the crosslinks do not interfere with desired properties of the viscoelastic lightguide. Generally, the PSA may be crosslinked to the extent that the crosslinks do not interfere with the viscous characteristics of the viscoelastic lightguide. Crosslinking is used to build molecular weight and strength of the PSA. The degree of crosslinking may be selected based upon the application for which the lightguide is intended. Crosslinking agents may be used to form chemical crosslinks, physical crosslinks or a combination thereof. Chemical crosslinks include covalent bonds and ionic bonds. Covalent crosslinks may be formed by incorporating a multi-functional monomer in the polymerization process, followed by curing using, e.g., ultraviolet radiation, heat, ionizing radiation, moisture, or a combination thereof.

Physical crosslinks include noncovalent bonds and are generally thermally reversible. Examples of physical crosslinks include high Tg (i.e., those having a Tg higher than room temperature, preferably higher than 70° C.) polymer segments included, for example, in thermoplastic elastomer block copolymers. Such segments aggregate to form physical crosslinks that dissipate upon heating. If a physically crosslinked PSA is used such as a thermoplastic elastomer, the embossing typically is carried out at temperature below, or even substantially below, the temperature at which the adhesive flows. Hard segments include the styrene macromers of U.S. Pat. No. 4,554,324 (Husman et al.) and/or acid/base interactions (i.e., those involving functional groups within the same polymer or between polymers or between a polymer and an additive) such as polymeric ionic crosslinking as described in WO 99/42536 (Stark et al.).

Suitable crosslinking agents are also disclosed in U.S. Pat. No. 4,737,559 (Kellen), U.S. Pat. No. 5,506,279 (Babu et al.), and U.S. Pat. No. 6,083,856 (Joseph et al.). The crosslinking agent can be a photocrosslinking agent, which, upon exposure to ultraviolet radiation (e.g., radiation having a wavelength of from about 250 to about 400 nm), causes the

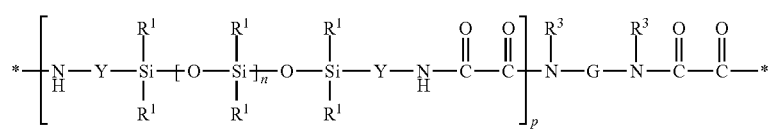

wherein: each R$^1$ is independently an alkyl, haloalkyl, aralkyl, alkenyl, aryl, or aryl substituted with an alkyl, alkoxy, or halo, wherein at least 50 percent of the R$^1$ groups are methyl; each Y is independently an alkylene, aralkylene, or a combination thereof; G is a divalent residue equal to a diamine of formula R$^3$HN-G-NHR$^3$ minus the two —NHR$^3$ groups; R$^3$ is hydrogen or alkyl or R$^3$ taken together with G and with the nitrogen to which they are both attached forms a heterocyclic group; n is independently an integer of 40 to 1500; and p is an integer of 1 to 10; and an asterisk (*)

copolymer to crosslink. The crosslinking agent is used in an effective amount, by which is meant an amount that is sufficient to cause crosslinking of the PSA to provide adequate cohesive strength to produce the desired final adhesion properties. Preferably, the crosslinking agent is used in an amount of about 0.1 part to about 10 parts by weight, based on the total weight of monomers.

In some embodiments, the viscoelastic lightguide comprises a PSA formed from a (meth)acrylate block copolymer as described in U.S. Pat. No. 7,255,920 B2 (Everaerts et al.).

In general, these (meth)acrylate block copolymers comprise: at least two A block polymeric units that are the reaction product of a first monomer composition comprising an alkyl methacrylate, an aralkyl methacrylate, an aryl methacrylate, or a combination thereof, each A block having a Tg of at least 50° C., the methacrylate block copolymer comprising from 20 to 50 weight percent A block; and at least one B block polymeric unit that is the reaction product of a second monomer composition comprising an alkyl (meth)acrylate, a heteroalkyl (meth)acrylate, a vinyl ester, or a combination thereof, the B block having a Tg no greater than 20° C., the (meth)acrylate block copolymer comprising from 50 to 80 weight percent B block; wherein the A block polymeric units are present as nanodomains having an average size less than about 150 nm in a matrix of the B block polymeric units.

In some embodiments, the viscoelastic lightguide comprises a clear acrylic PSA, for example, those available as transfer tapes such as VHB Acrylic Tape 4910F from 3M Company and Optically Clear Laminating Adhesives (8140 and 8180 series) from 3M Company.

In some embodiments, the viscoelastic lightguide comprises a PSA formed from at least one monomer containing a substituted or an unsubstituted aromatic moiety as described in U.S. Pat. No. 6,663,978 B1 (Olson et al.):

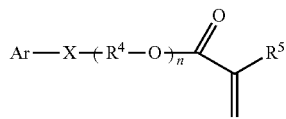

wherein Ar is an aromatic group which is unsubstituted or substituted with a substituent selected from the group consisting of $Br_y$ and $R^6_z$ wherein y represents the number of bromine substituents attached to the aromatic group and is an integer of from 0 to 3, $R^6$ is a straight or branched alkyl of from 2 to 12 carbons, and z represents the number of $R^6$ substituents attached to the aromatic ring and is either 0 or 1 provided that both y and z are not zero; X is either O or S; n is from 0 to 3; $R^4$ is an unsubstituted straight or branched alkyl linking group of from 2 to 12 carbons; and $R^5$ is either H or $CH_3$.

In some embodiments, the viscoelastic lightguide comprises a copolymer as described in U.S. Pat. No. 8,378,046 (Determan et al.), comprising (a) monomer units having pendant bephenyl groups and (b) alkyl (meth)acrylate monomer units.

In some embodiments, the viscoelastic lightguide comprises a copolymer as described in U.S. Pat. No. 8,309,650 (Determan et al.), comprising (a) monomer units having pendant carbazole groups and (b) alkyl (meth)acrylate monomer units.

In some embodiments, the viscoelastic lightguide comprises an adhesive as described in US 2010/0297406 (Schaffer et al.), comprising a block copolymer dispersed in an adhesive matrix to form a Lewis acid-base pair. The block copolymer comprises an AB block copolymer, and the A block phase separates to form microdomains within the B block/adhesive matrix. For example, the adhesive matrix may comprise a copolymer of an alkyl (meth)acrylate and a (meth)acrylate having pendant acid functionality, and the block copolymer may comprise a styrene-acrylate copolymer. The microdomains may be large enough to forward scatter incident light, but not so large that they backscatter incident light. Typically these microdomains are larger than the wavelength of visible light (about 400 to about 700 nm). In some embodiments the microdomain size is from about 1.0 to about 10 um.

The viscoelastic lightguide may comprise a stretch releasable PSA. Stretch releasable PSAs are PSAs that can be removed from a substrate if they are stretched at or nearly at a zero degree angle. In some embodiments, the viscoelastic lightguide or a stretch release PSA used in the viscoelastic lightguide has a shear storage modulus of less than about 10 MPa when measured at 1 rad/sec and −17° C., or from about 0.03 to about 10 MPa when measured at 1 rad/sec and −17° C. Stretch releasable PSAs may be used if disassembling, reworking, or recycling is desired.

In some embodiments, the stretch releasable PSA may comprise a silicone-based PSA as described in U.S. Pat. No. 6,569,521 B1 (Sheridan et al.) or US 2011/0020640 (Sherman et al.) and U.S. Pat. No. 8,673,419 (Determan et al.). Such silicone-based PSAs include compositions of an MQ tackifying resin and a silicone polymer. For example, the stretch releasable PSA may comprise an MQ tackifying resin and an elastomeric silicone polymer selected from the group consisting of urea-based silicone copolymers, oxamide-based silicone copolymers, amide-based silicone copolymers, urethane-based silicone copolymers, and mixtures thereof.

The viscoelastic lightguide may comprise an aerogel. An aerogel is a low-density solid state material derived from gel in which the liquid component of the gel has been replaced with air. Silica, alumina and carbon aerogels are exemplary aerogels that may be used.

The viscoelastic lightguide can optionally include one or more additives such as filler, particles, plasticizers, chain transfer agents, initiators, antioxidants, stabilizers, fire retardants, viscosity modifying agents, foaming agents, antistats, colorants such as dyes and pigments, fluorescent dyes and pigments, phosphorescent dyes and pigments, fibrous reinforcing agents, and woven and non-woven fabrics.

The viscoelastic lightguide may be made hazy and/or diffusive by including particles such as nanoparticles (diameter less than about 1 um), microspheres (diameter 1 um or greater), or fibers. Exemplary nanoparticles include $TiO_2$. Haze and diffusive properties can also be incorporated into the viscoelastic lightguide by incorporating bubbles into the lightguide. The bubbles may have a diameter of from about 0.01 to about 1 um. Bubbles may be introduced by adding, e.g., foaming agents. Examples of additional additives that may be added to the viscoelastic lightguide include glass beads, reflective particles, and conductive particles. In some embodiments, the viscoelastic lightguide may comprise a PSA matrix and particles as described in US 2011/0165361 (Sherman et al.), comprising an optically clear PSA and silicon resin particles having a refractive index less than that of the PSA. In some embodiments, the presence of particles, bubbles, air, etc. increases the scatter and uniformity of light.

In some embodiments, the viscoelastic lightguide provides an image as shown in FIGS. 10 and 11. An image may be made by structuring a surface of the lightguide as described above. For example, surface 1010 of FIG. 10 may be structured to provide the image. An image may be made by including or embedding material such as particles in the viscoelastic lightguide. The image may also be made by forming an image on a surface of the lightguide, e.g., on surface 1010. More than one surface of the lightguide may comprise an image. Surfaces of the viscoelastic lightguide may be imaged by printing or marking, e.g., by inkjet printing, laser printing, electrostatic printing and the like. Images may be monochrome such as black and white, or they may be colored. The materials used to form the images may reflect all or some light within a particular range of wavelengths, e.g., in the visible region. The materials used to form the images may function as color filters allowing light within a particular range of wavelengths, e.g., in the visible region, to be transmitted. Exemplary materials include colorants such as pigments and dyes.

In some embodiments, the viscoelastic lightguide provides an image by from holes in the lightguide. Holes may be made, e.g., by drilling through the lightguide.

In general, the viscoelastic lightguide is adapted to receive at least some light emitted by the light source. In some embodiments, a specially designed input surface may not be needed because the light source can be pressed into the viscoelastic lightguide such that optical coupling occurs. In some embodiments, the light source may stick to the viscoelastic lightguide, for example, if the lightguide comprises a PSA. In some embodiments, the light source may be embedded in the viscoelastic lightguide.

In some embodiments, the viscoelastic lightguide comprises an input surface adapted to receive light from the light source. The input surface may have a variety of topographies depending on the optical coupling means and/or the particular light source. The input surface may have an appropriate curvature. The input edge comprising the input surface may have a particular cavity, for example a concave hemispherical cavity, to receive a convex lens of a light source. Alternately, the input surface may have refractive structures such as prisms or lenses to optically couple light from the light source into the viscoelastic lightguide.

In some embodiments, an extractor article disposed between the light source and the input edge may be used to facilitate optical coupling with at least some of the light emitted by the light source. Useful extractor articles may have an appropriate curvature for extracting light from the light source. A coupling material for matching refractive indices of the viscoelastic lightguide and some element of the light source may be used. A crosslinkable material may be used for attaching the viscoelastic lightguide to some part of the light source, and subsequently cured using heat and/or light to form the crosslinked material.

The coupling material may comprise silicone gel. The silicone gel may be crosslinked. The silicone gel may be mixed with a silicone oil. The silicone gel may comprise one or more silicone materials such as, for example, dimethylsilicone, diphenylsilicone, or phenylmethylsilicone. The silicone gel may comprise phenylmethylsilicone moieties that are cross-linked. The silicone gel may comprise phenylmethylsilicone moieties which are cross-linked and phenylmethylsilicone oil. The silicone gel may comprise phenylmethylsilicone moieties which are cross-linked and phenylmethylsilicone oil in a weight ratio from 0.2:1 to 5:1. The silicone gel may comprise crosslinked phenylmethylsilicone. Exemplary use of silicone gels is described in U.S. Pat. No. 7,315,418 (DiZio et al.).

The light source may be optically coupled to the viscoelastic lightguide such that at least some of the light from the light source can enter the lightguide. For example, a light source may be optically coupled to the viscoelastic lightguide such that greater than 1, greater than 10, greater than 20, greater than 30, greater than 40, greater than 50, greater than 90%, or about 100% of light emitted by the light source enters the viscoelastic lightguide. For another example, a light source may be optically coupled to the viscoelastic lightguide such that from about 1 to about 10%, from about 1 to about 20%, from about 1 to about 30%, from about 1 to about 40%, from about 1 to about 50%, from about 1 to about 100%, from about 1 to about 100%, from about 50 to about 100%, or from about 1 to about 100% of light emitted by the light source enters the viscoelastic lightguide. The light source may emit light having a random or a particular angular distribution.

The light source may comprise any suitable light source. Exemplary light sources include linear light sources such as cold cathode fluorescent lamps and point light sources such as light emitting diode (LEDs). Exemplary light sources also include organic light-emitting devices (OLEDs), incandescent bulbs, fluorescent bulbs, halogen lamps, UV bulbs, infrared sources, near-infrared sources, lasers, or chemical light sources. In general, the light emitted by the light source may be visible or invisible. At least one light source may be used. For example, from 1 to about 10,000 light sources may be used. The light source may comprise a row of LEDs positioned at or near an edge of the viscoelastic lightguide. The light source may comprise LEDs arranged on a circuit such that light emitted from the LEDs lights up continuously or uniformly the viscoelastic lightguide throughout a desired area. The light source may comprise LEDs that emit light of different colors such that the colors can mix within the viscoelastic lightguide. In this way, a graphic could be designed to appear differently at different times during its use.

The light source may be powered by any suitable means. The light source may be powered using a battery, a DC power supply, an AC to DC power supply, an AC power supply, or a solar photovoltaic cell.

Figure 14:
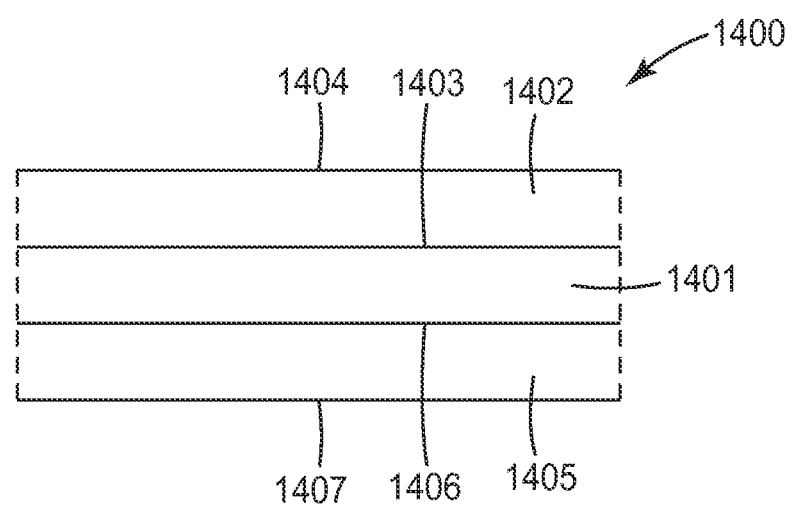
FIGS. 14 and 15a-15l show schematic cross sections of exemplary optical articles.

The viscoelastic lightguide can be used in a variety of multilayer constructions depending on the particular application. Some of these embodiments are described below. In general, the viscoelastic lightguide may be disposed on a substrate or between two substrates. Any one of the surfaces described above for the viscoelastic lightguide may be an interface formed between the lightguide and a substrate. For example, FIG. 14 shows a schematic cross section of exemplary optical article 1400 comprising first substrate 1402 disposed on viscoelastic lightguide 1401; first interface 1403 formed between the two may be any one of the surfaces described above for the lightguide. Exemplary optical article 1400 also comprises optional second substrate 1405 disposed on viscoelastic lightguide 1401 opposite first substrate 1402; second interface 1406 formed between the two may be any one of the surfaces described above for the lightguide. Any of the surfaces described above for the viscoelastic lightguide may be used in combination for first interface 1403 and second interface 1406.

Exemplary optical article 1400 also comprises first outer surface 1404 opposite first interface 1403, and second outer surface 1407 opposite second interface 1406. Any one of the surfaces described above for the viscoelastic lightguide may be first and/or second outer surfaces, 1404 and 1407, respectively. In general, any of the surfaces described above for the viscoelastic lightguide may be used in combination for first interface 1403, second interface 1406, first outer surface 1404 and second outer surface 1407.

Figure 15A:
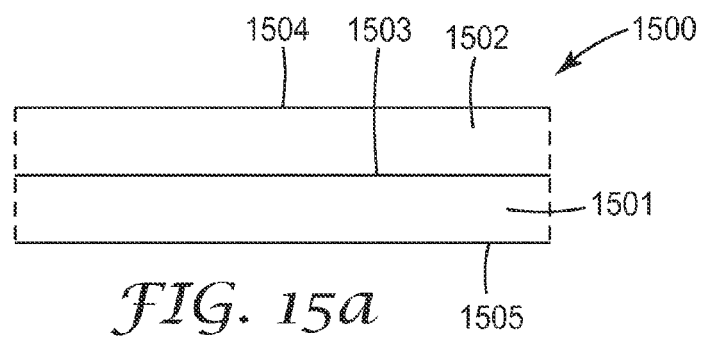

FIG. 15*a* shows a schematic cross section of exemplary optical article 1500 comprising first substrate 1502 disposed on viscoelastic lightguide 1501 (or vice versa). Any one of the surfaces described above for the viscoelastic lightguide may be first interface 1503 and/or first outer surface 1504. Surface 1505 of the viscoelastic lightguide may have any type of surface described above for the viscoelastic lightguide.

In some embodiments, first interface 1503, first outer surface 1504 and surface 1505 of viscoelastic lightguide 1501 are unstructured as shown in FIG. 15a. First substrate 1502 may have a refractive index less than that of viscoelastic lightguide 1501 such that the first substrate functions as a light containing substrate for light propagating within the lightguide. If the first substrate is a light containing substrate, then the first interface may be optically smooth such that light propagating within viscoelastic lightguide 1501 is transported by total internal reflection. For a light containing substrate in contact with the viscoelastic lightguide, the amount of light extracted from the lightguide and by the substrate may be less than about 0.5%, less than about 1%, less than about 2%, less than about 5%, or less than about 10% relative to the total amount of light that enters the lightguide. In general, at least a portion of surface 1505 is optically smooth such that light propagating within viscoelastic lightguide 1501 is transported by total internal reflection.

In some embodiments, first substrate 1502 may have a refractive index greater than that of viscoelastic lightguide 1501 such that the first substrate may function as a light extracting substrate. For a light extracting substrate in contact with the viscoelastic lightguide, the amount of light extracted from the lightguide and by the substrate may be greater than about 10%, greater than about 20%, greater than about 30%, greater than about 40%, greater than about 50%, greater than about 60%, greater than about 70%, greater than about 80%, or greater than about 90% relative to the total amount of light that enters the lightguide. In some embodiments, first substrate 1502 may have the same or nearly the same refractive index as that of viscoelastic lightguide 1501. In either embodiment, at least portions of first interface 1503 and surface 1505 are optically smooth such that light propagating within viscoelastic lightguide 1501 is transported by total internal reflection.

Figure 15B:
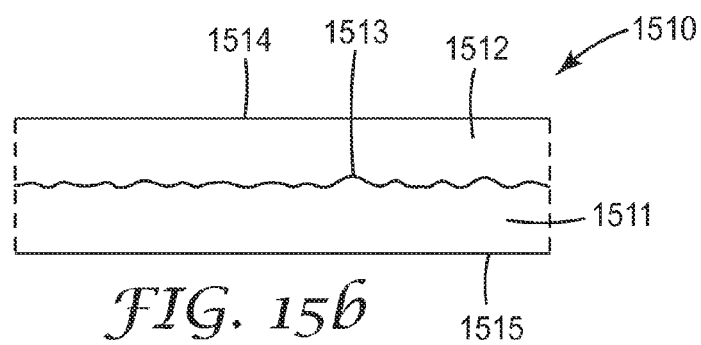

In some embodiments, one surface of the viscoelastic lightguide is structured or the first outer surface is structured; the other two surfaces are not structured. FIG. 15b shows a schematic cross section of exemplary optical article 1510 comprising first substrate 1512 disposed on viscoelastic lightguide 1511 (or vice versa). In this example, first interface 1513 is structured irregularly such that the first substrate is able to extract light from the viscoelastic lightguide. First substrate 1512 may have a refractive index greater than, less than, or nearly the same as that of viscoelastic lightguide 1511. The first substrate may function as a light extracting substrate. For a light extracting substrate in contact with the viscoelastic lightguide, the amount of light extracted from the lightguide and by the substrate may be greater than about 10%, greater than about 20%, greater than about 30%, greater than about 40%, greater than about 50%, greater than about 60%, greater than about 70%, greater than about 80%, or greater than about 90% relative to the total amount of light that enters the lightguide. At least portions of first interface 1513 and surface 1515 are optically smooth such that light propagating within the viscoelastic lightguide may be transported by total internal reflection.

In some embodiments, one surface of the viscoelastic lightguide is unstructured or the first outer surface is unstructured; the other two surfaces are structured. For example, the first interface and the first outer surface may be structured, and the other surface of the viscoelastic layer unstructured. The first interface and first outer layer may be structured such that the features of each are configured dependently within about 100 um. The first interface and first outer layer may be structured such that the features of each are configured independently not within about 100 um.

Figure 15C:
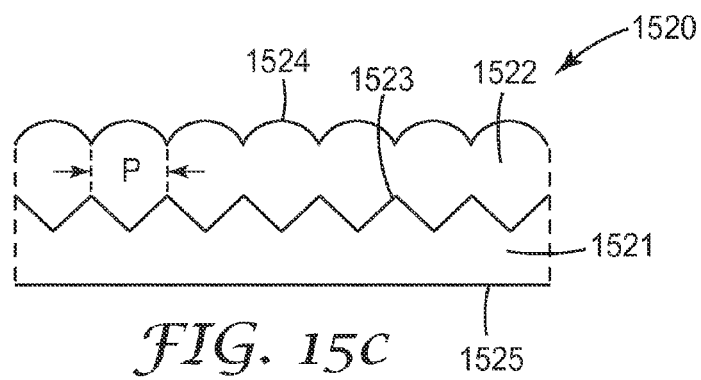

FIG. 15c shows a schematic cross section of exemplary optical article 1520 comprising first substrate 1522 disposed on viscoelastic lightguide 1521 (or vice versa). In this example, first interface 1523 is structured with prismatic features such that the first substrate is able to extract light from the viscoelastic lightguide. First outer surface 1524 is structured with lenticular features such that light can be emitted from the first substrate. The lenticular features and the prismatic features are configured dependently such that the period of repetition or pitch P for each pair of features (lenticular and prismatic) is about the same or at least within about 100 um. For each pair of features, the curvature of the lenticular feature may be such that its focal point coincides with the vertex of the prismatic feature. First substrate 1522 may have a refractive index greater than or less than that of viscoelastic lightguide 1521. Useful configurations of lenticular and prismatic features are described in US 2005/0052750 A1 (King et al.) and US 2005/0276071 (Sasagawa et al.). At least a portion of first interface 1523 and a portion of surface 1525 are optically smooth such that light propagating within the viscoelastic lightguide may be transported by total internal reflection.

The first substrate may function as a light extracting and light emitting substrate. For a light extracting and light emitting substrate in contact with the viscoelastic lightguide, the amount of light extracted from the lightguide and by the substrate may be greater than about 10%, greater than about 20%, greater than about 30%, greater than about 40%, greater than about 50%, greater than about 60%, greater than about 70%, greater than about 80%, or greater than about 90% relative to the total amount of light that enters the lightguide.

For a light extracting and light emitting substrate in contact with the viscoelastic lightguide, the amount of light emitted from the first substrate may be less than about 0.5%, less than about 1%, less than about 2%, less than about 5%, less than about 10%, less than about 20%, less than about 30%, less than about 40%, less than about 50%, less than about 60%, less than about 70%, less than about 80%, or less than about 90% relative to the total amount of light that enters the substrate; the amount of light emitted from the first substrate may be greater than about 10%, greater than about 20%, greater than about 30%, greater than about 40%, greater than about 50%, greater than about 60%, greater than about 70%, greater than about 80%, or greater than about 90% relative to the total amount of light that enters the substrate; or the amount of light emitted from the first substrate may be from about 10 to about 50%, from about 20 to about 50%, from about 30 to about 50%, from about 50 to about 70%, from about 50 to about 80%, or from about 10 to about 90% relative to the total amount of light that enters the substrate. At least portions of first interface 1523 and surface 1525 are optically smooth such that light propagating within viscoelastic lightguide 1521 is transported by total internal reflection.

Figure 15D:
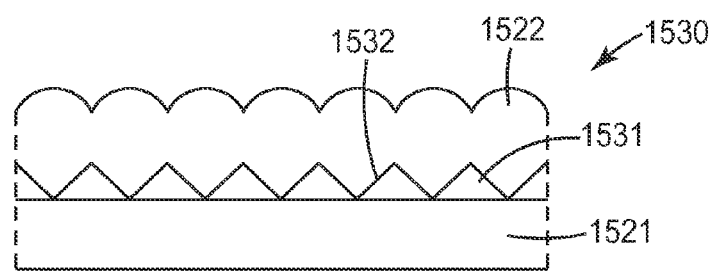

FIG. 15d shows a schematic cross section of exemplary optical article 1530 which also comprises first substrate 1522 disposed on viscoelastic lightguide 1521. In this embodiment, tips of the prismatic structures that form surface 1532 of first substrate 1522 are in contact with viscoelastic lightguide 1521 such that the two are optically coupled. Corresponding pockets 1531 are formed between the prismatic features and the lightguide. Surface 1532 may comprise any of those described above for the interfaces and outer surfaces. The refractive index of viscoelastic lightguide 1521 may be greater than that of the pocket material in pockets 1531, but less than that of first substrate 1522. In this case, the refractive index difference between the first substrate and the viscoelastic lightguide may be from about 0.002 to about 1; and the refractive index difference between viscoelastic lightguide 1521 and pocket material in pockets 1531 may be from about 0.002 to about 1.

The pockets may comprise air. The pockets may comprise a soft, compliant material such as any of the viscoelastic materials described above. The pockets may comprise a PSA. The pockets may comprise a silicone PSA. The first substrate may comprise the film described in King et al. and Sasagawa et al.

Figure 15E:
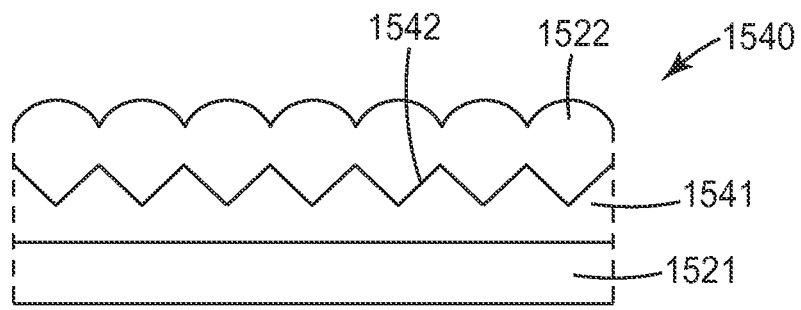

In some embodiments, the first substrate comprises more than one substrate. FIG. 15e shows a schematic cross section of optical article 1540 comprising first substrate 1541 disposed on viscoelastic lightguide 1521. Additional first substrate 1522 is disposed on first substrate 1541 opposite the viscoelastic lightguide. The additional substrate is not optically coupled directly with the viscoelastic lightguide, however, it may be optically coupled indirectly, i.e., by extracting light from the first substrate. The refractive index of first substrate 1541 may be greater than that of viscoelastic lightguide 1521, and the refractive index of additional first substrate 1522 may be may be greater than, less than, or about the same as that of the lightguide. The refractive index difference between the first substrate and the viscoelastic lightguide may be from about 0.002 to about 1; and the refractive index difference between the additional first substrate and the lightguide may be from about 0.002 to about 1.

One may determine theoretically how varying the orientation of each feature (or lack thereof) may affect the amount and distribution of light that can be extracted from the viscoelastic lightguide by the first substrate. Further, one may determine theoretically how varying the orientation of each feature (or lack thereof) may affect the amount and distribution of light that can be emitted from the first substrate. In both cases, ray tracing techniques that are consistent with the law of refraction and the principle of total internal reflection as described above may be used.

The first substrate may comprise a light emitting layer as described above. The amount and direction of light emitted from the first substrate may be controlled, at the very least, by the shape, size, number, arrangement, etc. of the features that form the first outer surface. In general, the first substrate can be designed such that light may be emitted from the substrate as described above for the viscoelastic lightguide. For example, light may be emitted from the first substrate in at least one predetermined direction, e.g., 1, 2, 3, 4, 5, 6, 7, 8, 9, 10, or more predetermined directions; from 1 to about 3 predetermined directions; from 1 to about 5 predetermined directions; from 1 to about 10 predetermined directions; or from 1 to about 100 predetermined directions. The light emitted in at least one predetermined direction may be emitted in a pattern. The light emitted in at least one predetermined direction may be emitted uniformly (at the same or nearly the same intensity) or non-uniformly from the first substrate. Light may also be emitted in random directions from the first substrate and/or at various random intensities from the substrate.

Figure 16:
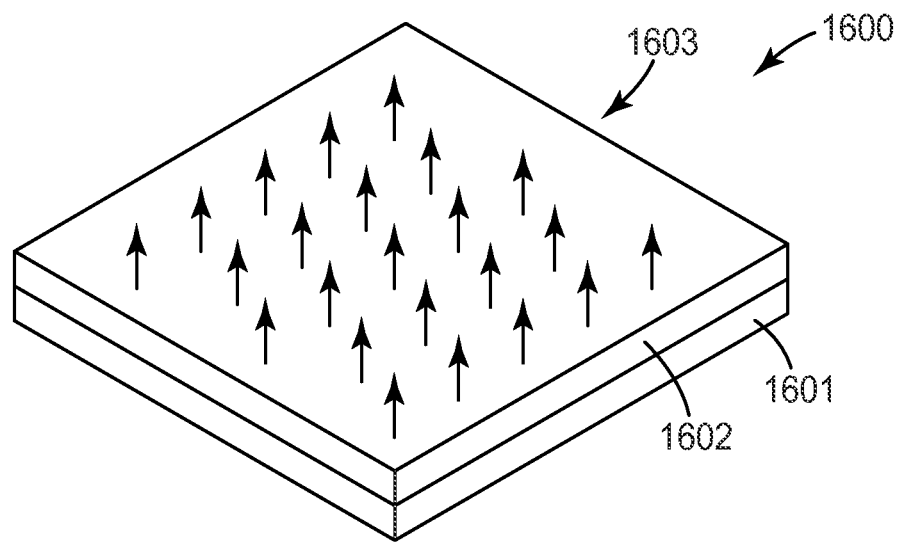
FIGS. 16 and 17 show schematic perspective views of exemplary optical articles.

Light may be emitted from the first substrate in the same manner as shown in FIGS. 7-11 for the viscoelastic lightguide. For example, FIG. 16 shows a perspective view of exemplary optical article 1600 comprising first substrate 1602 disposed on viscoelastic lightguide 1601. Light represented by rays 1603 is emitted in a predetermined direction from the first substrate. Light may also be emitted in more than one predetermined direction, randomly, in one or more shapes, in discrete areas, at different intensities, etc.

Figure 17:
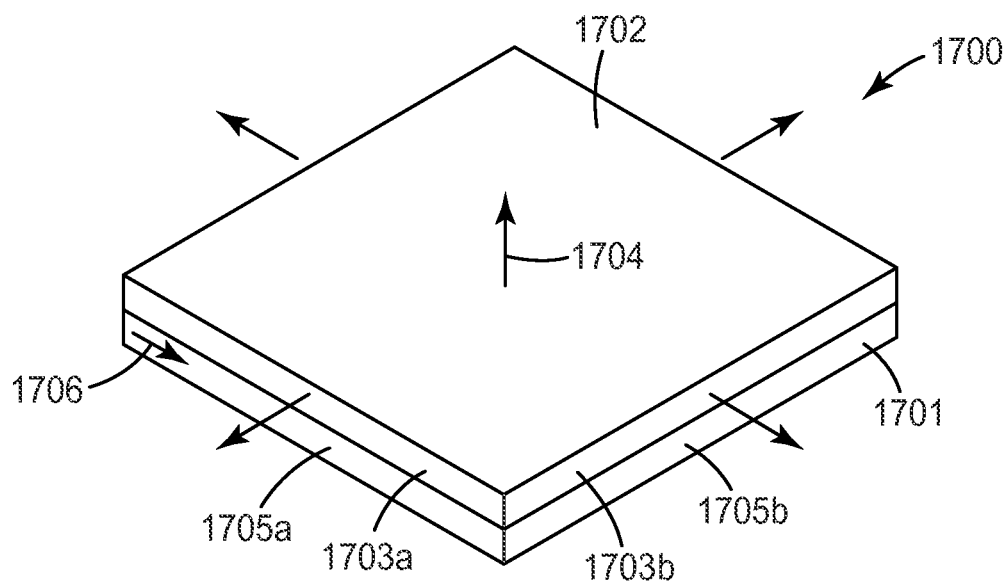

Light may be emitted from any surface of the first substrate. FIG. 17 illustrates how light may be emitted from an exemplary optical article comprising a first substrate and a viscoelastic lightguide, both shown in the shape of a film or sheet. FIG. 17 shows a perspective view of exemplary optical article 1700 comprising a first substrate disposed on viscoelastic lightguide 1701. The first substrate comprises major surface 1702 and edge surfaces 1703a-d (1703c and 1703d not shown). Light may be emitted from any one or some combination of surfaces 1702 and 1703a-d. For example, light may be emitted only from major surface 1702 as shown by ray 1704. For another example, light may be emitted only from edge surface 1703b.

Exemplary optical article 1700 also comprises a major surface of viscoelastic lightguide 1701, the major surface being opposite major surface 1702 of the first substrate. Exemplary optical article 1700 also comprises edge surfaces 1705a-c (1703c not shown). Light may be emitted from the first substrate and/or the viscoelastic lightguide, in any one or some combination of major surfaces and edge surfaces. Light which enters the viscoelastic lightguide is shown by ray 1706.

In some embodiments, a surface of the first substrate is microstructured with air release channels as described above for the viscoelastic lightguide.

The first substrate may have any bulk three-dimensional shape as is needed for a given application. The first substrate may be commensurate in size with the viscoelastic lightguide, or it may be larger, smaller, thicker, thinner, etc. than the viscoelastic lightguide. The first substrate may be in the form of a square or rectangular layer, sheet, film, etc. as shown in FIGS. 16 and 17.

The thickness of the first substrate is not particularly limited as long as it can function as desired. The thickness of the first substrate may be selected such that it can extract and emit light as desired. A maximum thickness of the first substrate may be required for use in particular optical devices designed to be particularly thin. Exemplary thicknesses for the first substrate range from about 0.4 mil to about 1000 mil, from about 1 mil to about 300 mil, from about 1 mil to about 60 mil, or from about 0.5 mil to about 30 mil.

In some embodiments, the first substrate is viscoelastic and comprises any one or more of the viscoelastic materials described above for the viscoelastic lightguide. A viscoelastic first substrate may need to comprise appropriate tensile strength values, viscous characteristics, and properties that facilitate sufficient optical coupling with at least a portion of a viscoelastic lightguide. A viscoelastic first substrate is generally soft, compliant and flexible. A viscoelastic first substrate may have an elastic modulus, viscous modulus, and damping coefficient as described above for the viscoelastic lightguide. In some embodiments, the first substrate comprises a PSA layer as described above for the viscoelastic lightguide. The first substrate may have a particular peel force or at least exhibit a peel force within a particular range as described above for the viscoelastic lightguide.

In some embodiments, the first substrate comprises an optically clear substrate having high light transmittance of from about 80 to about 100%, from about 90 to about 100%, from about 95 to about 100%, or from about 98 to about 100% over at least a portion of the visible light spectrum. In some embodiments, the first substrate has a haze value of less than about 5%, less than about 3%, or less than about 1%. In some embodiments, the first substrate has a haze value of from about 0.01 to less than about 5%, from about 0.01 to less than about 3%, or from about 0.01 to less than about 1%.

In some embodiments, the first substrate comprises an optically clear substrate having high light transmittance and a low haze value. High light transmittance may be from about 90 to about 100%, from about 95 to about 100%, or from about 98 to about 100% over at least a portion of the visible light spectrum, and haze values may be from about 0.01 to less than about 5%, from about 0.01 to less than about 3%, or from about 0.01 to less than about 1%. In some embodiments, the first substrate is hazy and diffuses light, particularly visible light. A hazy first substrate may have a haze value of greater than about 5%, greater than about 20%, or greater than about 50%. A hazy first substrate may have a haze value of from about 5 to about 90%, from about 5 to about 50%, or from about 20 to about 50%.

In some embodiments, the first substrate has low light transmittance, for example, from about 0.1 to about 70%, from about 0.1 to about 50%, or from about 0.1 to about 20%.

In some embodiments, the first substrate may be translucent in that it reflects and transmits light.

The first substrate may have a refractive index in the range of from about 1.3 to about 2.6, 1.4 to about 1.7, or from about 1.5 to about 1.7. The particular refractive index or range of refractive indices selected for the first substrate may depend on the overall design of the optical article or device, e.g., the presence or absence of any additional substrates in contact with the first substrate and the particular application in which the article or device may be used.

In some embodiments, the first substrate comprises one or more viscoelastic materials as described above for the viscoelastic lightguide. In some embodiments, the first substrate comprises a PSA as described above for the viscoelastic lightguide. In some embodiments, the first substrate and the viscoelastic lightguide comprise viscoelastic materials. In some embodiments, the first substrate and the viscoelastic lightguide comprise PSAs.

In some embodiments, the viscoelastic lightguide comprises a clear acrylic PSA, and the first substrate comprises a silicone PSA. The silicone PSA may comprise a stretch releasable PSA as described above. The refractive index of the clear acrylic PSA may be greater than that of the silicone PSA, e.g., the refractive index difference may be from about 0.04 to about 0.09. Exemplary clear acrylic PSAs are available as transfer tapes such as VHB Acrylic Tape 4910F from 3M Company and Optically Clear Laminating Adhesives (8140 and 8180 series) from 3M Company. Silicone PSAs include any of those described above such as the silicone PSAs comprising polydiorganosiloxane polyoxamide.

In some embodiments, the first substrate comprises an adhesive that is useful for adhering the viscoelastic lightguide to an article such as a dashboard of a vehicle or a painted wall. Useful adhesives include optically clear adhesives, optically diffuse adhesives, radiation cured adhesives, thermal cured adhesives, hot melt adhesives, cold seal adhesives, heat activated adhesives, adhesives that cure at room temperature and structural adhesives having an adhesive bond strength of at least about 6 MPa, and the like. Structural adhesives are available as SCOTCH-WELD Adhesives from 3M Company.

In some embodiments, the first substrate is not viscoelastic.

In some embodiments, the first substrate comprises a polymer. In some embodiments, the first substrate comprises a polymeric film. Useful polymeric films include cellulose acetate, poly(meth)acrylate (acrylate and/or methacrylate), polyether sulfone, polyurethane, polyester, polycarbonate, polymethyl methacrylate, polyvinyl chloride, syndiotactic polystyrene, cyclic olefin copolymer, polyethylene terephthalate, polyethylene naphthalate, copolymer or blend based on naphthalene dicarboxylic acids, or some combination thereof. In some embodiments, the first substrate comprises a poly(meth)acrylate having a refractive index greater than that of the viscoelastic lightguide.

The first substrate may be a reflector that reflects incident light being transported within the viscoelastic lightguide. In some embodiments, the reflector comprises a specular reflector wherein light propagating within the viscoelastic lightguide is reflected at a surface of the specular reflector according to the law of reflection. The law of reflection states that for light incident upon a surface and reflected by the surface, the reflection angle, r, is the same as or nearly the same as the incident angle, t, wherein both angles are defined relative to a plane of the surface. For a specular reflector, the reflection angle of light is within about 16° of the incident angle. A specular reflector may be fully or near fully specular as a reflector over some range of incident angles. Also, specular reflectors may be from about 85 to about 100% reflective, from about 90 to about 100%, or from about 95 to about 100%, across a particular region of the electromagnetic spectrum, for example, the visible region.

Suitable specular reflectors include mirrors such as a plane mirrors comprising a film of reflecting material, typically a metal, coated on glass. Suitable reflectors include mirrors that are multilayer optical films. Useful multilayer optical films comprise films having from about 10 to about 10,000 alternating layers of first and second polymer layers wherein the polymer layers comprise polyesters. Exemplary multilayer optical films are described in U.S. Pat. Nos. 5,825,543; 5,828,488 (Ouderkirk et al.); U.S. Pat. Nos. 5,867,316; 5,882,774; 6,179,948 B1 (Merrill et al.); U.S. Pat. Nos. 6,352,761 B1; 6,368,699 B1; 6,927,900 B2; 6,827,886 (Neavin et al.); U.S. Pat. No. 6,972,813 B1 (Toyooka); U.S. Pat. No. 6,991,695; 2006/0084780 A1 (Hebrink et al.); 2006/0216524 A1; 2006/0226561 A1 (Merrill et al.); 2007/0047080 A1 (Stover et al.); WO 95/17303; WO 95/17691; WO 95/17692; WO 95/17699; WO 96/19347; WO 97/01440; WO 99/36248; and WO 99/36262.

Exemplary specular reflectors include those available from 3M Company, for example, High Intensity Grade Reflective Products such as High Reflective Visible Mirror Film and High Transmission Mirror Film, and VIKUITI films such as the VIKUITI Enhanced Specular Reflector film product.

In some embodiments, the reflector comprises a diffuse reflector wherein light propagating within the viscoelastic lightguide is reflected and scattered at a surface of the diffuse reflector. For a diffuse reflector, light of a given incident angle reflects with multiple reflection angles wherein at least some of the reflection angles are greater than about 16° of the incident angle. A diffuse reflector may be fully or near fully reflective over some range of incident angles. Also, diffuse reflectors may be from about 85 to about 100% reflective, from about 90 to about 100%, or from about 95 to about 100%, across a particular region of the electromagnetic spectrum, for example, the visible region.

A diffuse reflector may comprise an irregular surface with respect to the wavelength of light being reflected. Light may be reflected at the surface. The diffuse reflector may comprise a layer of organic, inorganic or hybrid organic/inorganic particles disposed on a substrate. The particles may have a diameter of from greater than about 0.01 to about 100 um, from greater than about 0.05 to about 100 um, or from greater than about 0.05 to about 50 um. The particles may be polymeric particles, glass beads, inorganic particles, metal oxide particles, or hybrid organic/inorganic particles. The particles may be solid, porous or hollow. The particles may comprise microspheres having a polymeric shell with a blowing agent such as isobutene or isopentane inside the shell, for example, microspheres available as EXPANCEL microspheres from Expancel Co. The particles may be dispersed in a polymeric material or binder. Binders include one or more polymers and may be, for example, any of the viscoelastic materials and adhesive materials (cold seal adhesives, etc.) described above. The binder may comprise a PSA. The binder and particles may be coated onto a substrate such that the thickness of the binder is greater than, less than or about the same as the diameter of the particles. The substrate may comprise a polymer, metal, specular reflector, and the like.

For example, the diffuse reflector may comprise a layer of barium sulfate particles loaded in a polyethylene terephalate film. Other constructions that provide a reflective surface are described in U.S. Pat. No. 7,481,563 (David et al.).

In some embodiments, the binder is light transmissive such that at least some of the light incident upon the layer enters the layer and becomes diffused. This diffused light is reflected upon being incident on a substrate that is a reflector. The diffusive material may comprise particles dispersed in a binder as described above. The refractive indices of the particles and binder may be different. For example, the refractive indices of the particles and binder may differ from about 0.002 to about 1, or from about 0.01 to about 0.5. This type of diffuse reflector may be from about 85 to about 100% reflective, from about 90 to about 100%, or from about 95 to about 100%, across a particular region of the electromagnetic spectrum, for example, the visible region. Exemplary light diffusing materials are described in U.S. Pat. No. 6,288,172 B1 (Goetz et al.). For example, the particles may comprise hollow glass spheres having a mean diameter of about 18 um (SPHERICEL Grade 60P18 from Potters Industries Inc.), and the binder may comprise a PSA such as a silicone PSA.

In some embodiments, the first substrate comprises a multilayer optical film. Multilayer optical films that are mirrors are described above. Other types of multilayer optical films may also be used, for example, the multilayer optical film may be a reflective film, a polarizer film, a reflective polarizer film, a diffuse blend reflective polarizer film, a diffuser film, a brightness enhancing film, a turning film, a mirror film, or a combination thereof. Exemplary multilayer optical films include VIKUITI film products available from 3M Company. Exemplary multilayer optical films are described in the references cited above for multilayer optical films that are mirrors.

In some embodiments, the first substrate comprises a polymeric film, metal, glass, ceramic, paper, fabric, or a combination thereof. In some embodiments, the first substrate comprises metal such as aluminum. In some embodiments, the first substrate comprises glass which generally comprises a hard, brittle, amorphous solid, including, soda-lime glass, borosilicate glass, acrylic glass, sugar glass, and the like. In some embodiments, the first substrate comprises a ceramic comprising some amount of crystalline structure and made, for example, from inorganic non-metallic materials. In some embodiments, the first substrate comprises paper, for example, paper made from cellulose pulp. In some embodiments, the first substrate comprises fabric, for example, leather, woven fabrics, non-woven fabrics.

In some embodiments, the first substrate comprises a release liner. Release liners typically have a low adhesion surface for contact with an adhesive layer. Release liners may comprise paper such as Kraft paper, or polymeric films such as poly(vinyl chloride), polyester, polyolefin, cellulose acetate, ethylene vinyl acetate, polyurethane, and the like. The release liner may be coated with a layer of a release agent such as a silicone-containing material or a fluorocarbon-containing material. The release liner may comprise paper or a polymeric film coated with polyethylene which is coated with a silicone-containing material. Exemplary release liners include liners commercially available from CP Films Inc. under the trade designations "T-30" and "T-10" that have a silicone release coating on polyethylene terephthalate film.

Exemplary release liners include structured release liners. Exemplary release liners include any of those referred to as microstructured release liners. Microstructured release liners are used to impart a microstructure on the surface of an adhesive layer. The microstructured surface can aid air egress between the adhesive layer and the adjacent layer. In general, it is desirable that the microstructure disappear over time to prevent interference with optical properties. Microstructures are generally three-dimensional structures that are microscopic in at least two dimensions (i.e., the topical and/or cross-sectional view is microscopic). The term "microscopic" as used herein refers to dimensions that are difficult to resolve by the human eye without aid of a microscope.

The microstructures may assume a variety of shapes. Representative examples include hemispheres, prisms (such as square prisms, rectangular prisms, cylindrical prisms and other similar polygonal features), pyramids, ellipses, grooves (e.g., V-grooves), channels, and the like. In some cases, it may be desirable to include topographical features that promote air egress at the bonding interface when the article is laminated to a substrate. In this regard, V-grooves and channels that can extend to the edge of the article are particularly useful. The particular dimensions and patterns characterizing the microstructures are selected based upon the specific application for which the article is intended. Another example of useful microstructures are described in US 2007/0292650 A1 (Suzuki) wherein the microstructured adhesive layer surface has one or more grooves that exist only in an inner area of the surface and are not open at side surfaces of the layer. These grooves may be in the form of a straight line, branched straight lines, cross, circle, oval, or polygon as viewed from above, and where each form may be composed of plural discontinuous grooves. These grooves may have a width of from 5 to 100 micrometers and a depth of from 5 to 50 micrometers.

In some embodiments, optical articles comprising a viscoelastic lightguide and a first substrate may provide an image. A variety of different constructions of the viscoelastic lightguide and the first substrate may be made to provide an image. An image may be made by structuring a surface of the first substrate as described above. For example, first substrate 1602 of FIG. 16 may be structured to provide the image.

Figure 15F:
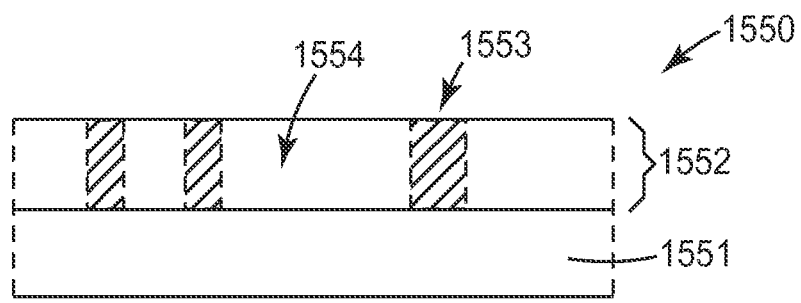

An image may be made by including or embedding different materials such as particles in regions of the first substrate wherein the regions are arranged to form an image. FIG. 15*f* shows a schematic cross section of exemplary optical article 1550 that may be used to provide an image. Exemplary optical article 1550 comprises first substrate 1552 disposed on viscoelastic lightguide 1551. The first substrate comprises two different materials used to form regions 1553 and 1554 which are arranged to form the image. Light propagating within the viscoelastic lightguide behaves differently upon striking the interface between the first substrate and the lightguide, depending on whether the interface is formed between the lightguide and region 1553 or 1554. For example, light incident upon an interface with region 1553 may be reflected, and light incident upon an interface with region 1554 may be extracted. For another example, light incident upon an interface with region 1553 may be reflected, and light incident upon an interface with region 1554 may be extracted selectively for light within a particular range of wavelengths.

Figure 15G:
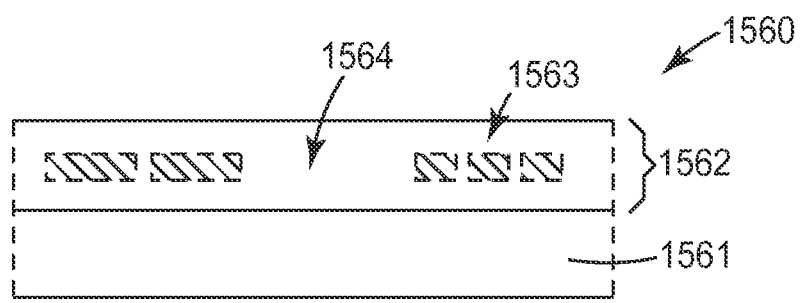

FIG. 15*g* shows a schematic cross section of exemplary optical article 1560 that may be used to provide images. Exemplary optical article 1560 comprises first substrate 1562 disposed on viscoelastic lightguide 1561. The first substrate comprises an image formed by regions of imaging materials 1563 suspended in bulk material 1564. Light propagating within the viscoelastic lightguide may be extracted by bulk material 1564. Regions 1563 may reflect light or transmit light within a particular range of wavelengths depending on the particular imaging materials. Colorants such as pigments and dyes may be used as the imaging materials.

Figure 15H:
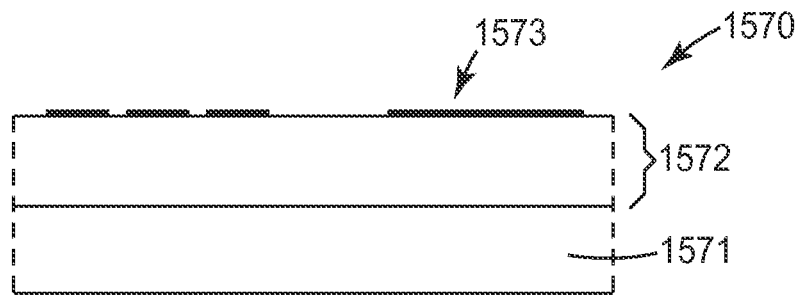
Figure 15I:
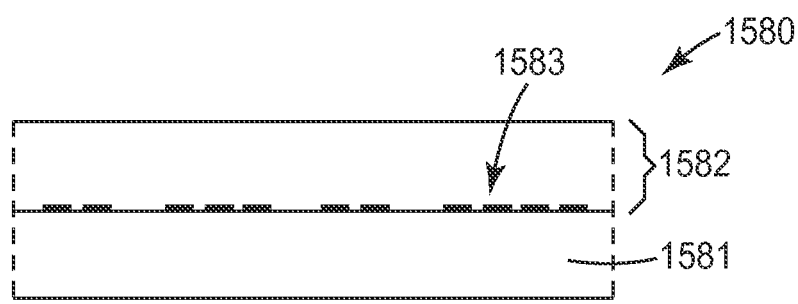

An image may be made by depositing material on a surface of the first substrate wherein the material is arranged to form the image. FIG. 15*h* shows a schematic cross section of exemplary optical article 1570 that may be used to provide an image. Exemplary optical article 1570 comprises first substrate 1572 disposed on viscoelastic lightguide 1571. Material 1573 is deposited onto the first substrate such that an image is formed by reflection of light within the first substrate and/or transmission of light within a particular range of wavelengths.

An image may be made by depositing material between the first substrate and the viscoelastic lightguide wherein the material is arranged to form the image. Exemplary optical article 1580 comprises first substrate 1582 disposed on viscoelastic lightguide 1581. Material 1583 is deposited between the lightguide and the first substrate such that an image is formed by reflection of light within viscoelastic lightguide 1581 and/or extraction of light into first substrate 1582 wherein the extracted light may be within a particular range of wavelengths.

For any one of the optical articles shown in FIG. 15*f-i*, imaging materials may be deposited by printing or marking, e.g., by inkjet printing, laser printing, electrostatic printing and the like. Images may be monochrome such as black and white images, or they may be colored images. Images may comprise one or more colors throughout, e.g., a uniform layer of color. Images that provide a general or custom surface may be used. For example, an image may be designed such that the optical article appears as plastic, metal or wood grain; fabric, leather, non-woven, etc. The image may also comprise white dots which may be disposed on a surface or interface. The white dots may be arranged as described for extraction features of conventional solid lightguides, e.g., as described in Kinder et al. Useful imaging materials include those that reflect all or some light within a particular range of wavelengths. Useful imaging materials include those that transmit all or some light within a particular range of wavelengths. Exemplary imaging materials include colorants such as pigments and dyes. Imaging materials may also comprise photonic crystals.

Any one of first substrates 1552, 1562, 1572 and 1582 may comprise a polymeric film. Any one of the polymeric films may be translucent. Any one of these first substrates may be an adhesive wherein useful adhesives include optically clear adhesives, optically diffuse adhesives, radiation cured adhesives, hot melt adhesives, cold seal adhesives, heat activated adhesives, and structural adhesives having an adhesive bond strength of at least about 6 MPa, and the like.

Any one of the optical articles shown in FIGS. 15*f-i* may comprise a clear acrylic PSA as the viscoelastic lightguide. Any one of the optical articles shown in FIGS. 15*f-i* may comprise a clear acrylic PSA as the viscoelastic lightguide and a polymeric film as the first substrate. Any one of the optical articles shown in FIGS. 15*f-i* may comprise a clear acrylic PSA as the viscoelastic lightguide and a translucent polymeric film as the first substrate. Any one of the optical articles shown in FIGS. 15*f-i* may comprise a clear acrylic PSA as the viscoelastic lightguide and an adhesive layer as the first substrate.

Any one of the optical articles shown in FIGS. 15*f-i* may comprise a second substrate disposed on the viscoelastic lightguide opposite the first substrate. The second substrate may comprise a reflector. For example, any one of the optical articles shown in FIGS. 15*f-i* may comprise a clear acrylic PSA as the viscoelastic lightguide, a translucent polymeric film as the first substrate, and a second substrate comprising a reflector. Any of the diffuse and specular reflectors described above may be used.

Figure 15J:
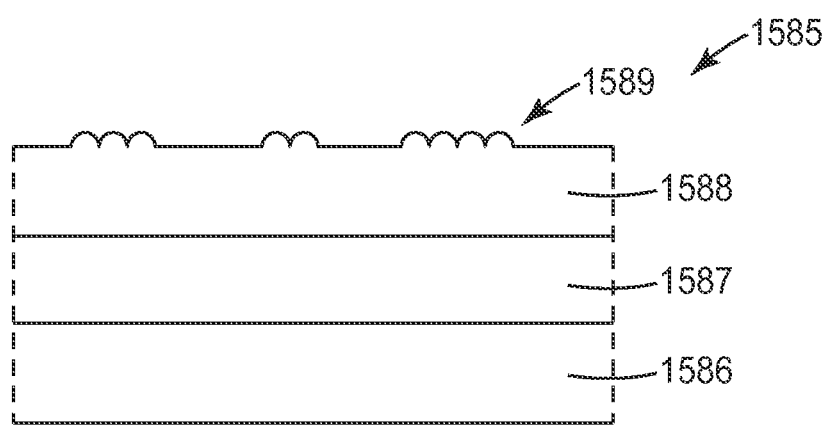
Figure 15K:
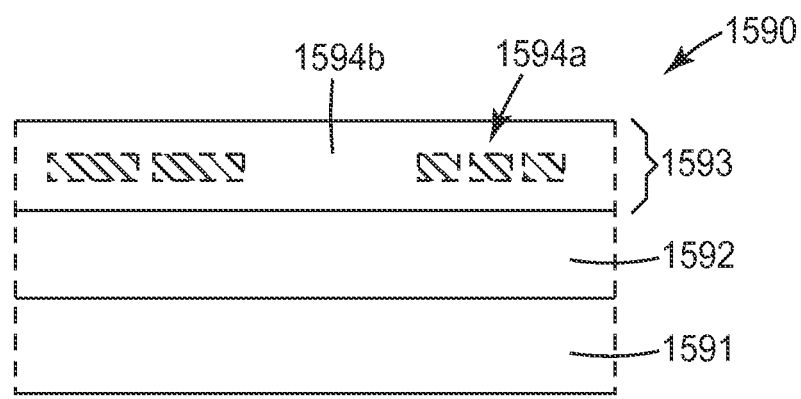
Figure 15L:
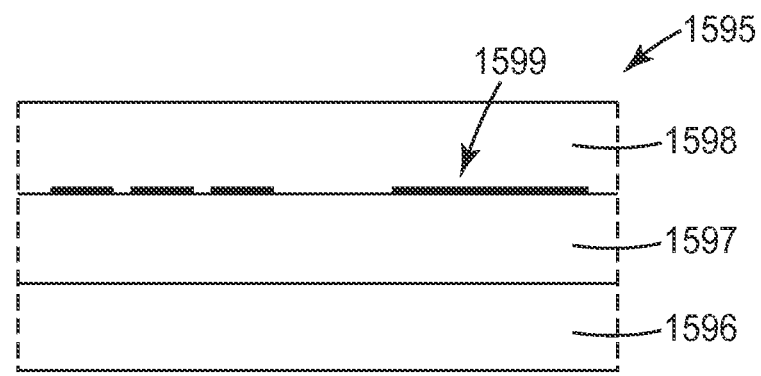

Constructions that may be used to provide an image are also shown in FIGS. 15*j-l*. FIG. 15*j* shows a schematic cross section of exemplary optical article 1585 comprising first substrate 1587 disposed between viscoelastic lightguide 1586 and additional substrate 1588. Surface 1589 of additional substrate 1588 is structured to form an image. FIG. 15*k* shows a schematic cross section of exemplary optical article 1590 comprising first substrate 1592 disposed between viscoelastic lightguide 1591 and additional substrate 1593. Additional substrate 1593 comprises an overlay, the overlay comprising regions of imaging materials 1594*a* suspended in bulk material 1594*b*. FIG. 15*l* shows a schematic cross section of exemplary optical article 1595 comprising first substrate 1597 disposed between viscoelastic lightguide 1596 and additional substrate 1598. Material 1599 is deposited between first substrate 1597 and additional substrate 1598 such that an image is formed by reflection of light within the first substrate and/or transmission of light within a particular range of wavelengths.

Any one of additional substrates 1588, 1593 and 1598 may comprise a polymeric film. Any one of the polymeric films may be translucent. Any one of the first substrates 1587, 1592 and 1597 may be viscoelastic. Any one of the first substrates may comprise a PSA. Any one of the first substrates may comprise a silicone PSA. The first substrates may comprise an adhesive wherein useful adhesives include optically clear adhesives, optically diffuse adhesives, radiation cured adhesives, hot melt adhesives, cold seal adhesives, heat activated adhesives, and structural adhesives having an adhesive bond strength of at least about 6 MPa, and the like.

Any one of the optical articles shown in FIGS. 15*j-l* may comprise a polymeric film as the additional layer and an adhesive that is the first substrate. Any one of the optical articles shown in FIGS. 15*j-l* may comprise a translucent polymeric film as the additional layer and an adhesive that is the first substrate. For example, any one of the optical articles shown in FIGS. 15j-l may comprise a clear acrylic PSA as the viscoelastic lightguide, a silicone PSA as the first substrate, and a polymeric imaged film as the additional layer. For another example, any one of the optical articles shown in FIGS. 15j-l may comprise a clear acrylic PSA as the viscoelastic lightguide, a silicone PSA as the first substrate, and a translucent polymeric imaged film as the additional layer.

Any one of the optical articles shown in FIGS. 15f-i may comprise a second substrate disposed on the viscoelastic lightguide opposite the first substrate. The second substrate may comprise a reflector. For example, any one of the optical articles shown in FIGS. 15f-i may comprise a clear acrylic PSA as the viscoelastic lightguide, a silicone PSA as the first substrate, a translucent polymeric film as the additional substrate, and a second substrate comprising a reflector. Any of the diffuse and specular reflectors described above may be used.

Multilayer constructions comprising the viscoelastic lightguide disposed between two substrates are described below. FIG. 14 shows a schematic cross section of exemplary optical article 1400 comprising viscoelastic layer 1401 disposed between first substrate 1402 and second substrate 1405. First substrate 1402 forms first interface 1403 with the viscoelastic layer and first outer surface 1404 is disposed opposite the interface. Second substrate 1405 forms second interface 1406 and second outer surface 1407 is disposed opposite the interface.

This multiple layer construction can manage light in many ways according to structure, refractive index, and material composition of the first substrate, second substrate and viscoelastic lightguide. In general, one may determine theoretically how varying parameters of optical article 1400 can affect the way by which light is managed by the article. This may be carried out using ray tracing techniques consistent with the law of refraction and the principle of total internal reflection.

The first and second substrates may comprise the same substrate such that the same surfaces of the substrates are positioned the same way with respect to the viscoelastic lightguide. The first and second substrates may comprise the same substrate such that the same surfaces of the substrates are positioned differently with respect to the viscoelastic lightguide. The first and second substrates may comprise different substrates.

The first and second substrates may be any combination of first substrates described above. The first and second substrates may be some combination of light containing, light extracting and light emitting substrates. Each of the first and second substrates may be some combination of light containing, light extracting and light emitting substrates. The first substrate may be a light containing substrate, and the second a light extracting substrate. The first substrate may be a light containing substrate, and the second a light extracting and light emitting layer. The first and second substrates may extract and/or emit light as described above for the first substrate of two layer constructions.

Parameters that may be varied include the structure of the first and second interfaces and the structure of the first and second outer surfaces. In general, at least portions of the first and second interfaces are optically smooth such that light propagating within the viscoelastic lightguide may be transported by total internal reflection. In some embodiments, the first and second interfaces and the first and second outer surfaces are unstructured as shown in FIG. 14. In some embodiments, any one of the first and second interfaces and the first and second outer surfaces is structured as described above for the viscoelastic lightguide and the first substrate. In some embodiments, any two of the first and second interfaces and the first and second outer surfaces are structured as described above for the viscoelastic lightguide and the first substrate. For example, the first and second interfaces may be structured with prismatic features for extracting light from the first and second substrates, respectively. In some embodiments, any three of the first and second interfaces and the first and second outer surfaces are structured as described above for the viscoelastic lightguide and the first substrate. In some embodiments, all four of the first and second interfaces and the first and second outer surfaces are structured as described above for the viscoelastic lightguide and the first substrate.

Figure 18A:
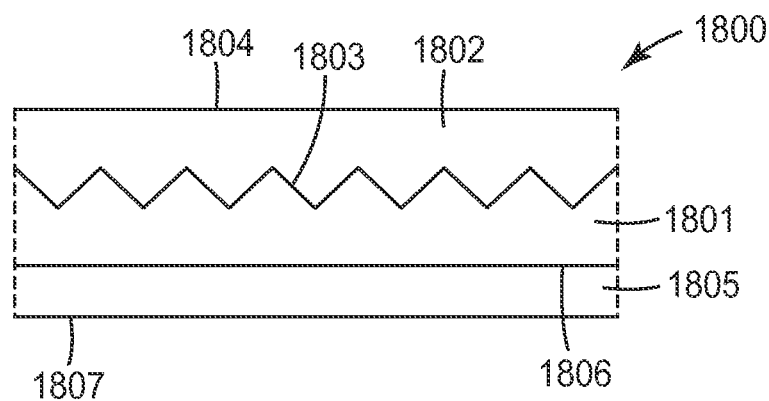
FIGS. 18a-18b show schematic cross sections of exemplary optical articles.
Figure 18B:
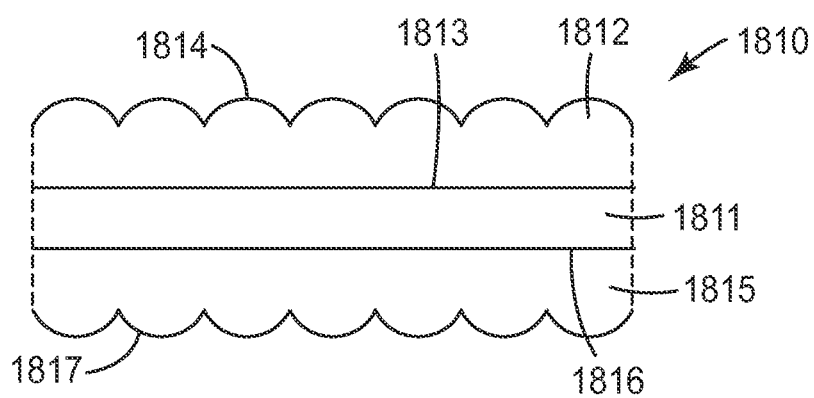

In general, optical article 1400 may comprise any of the structured interfaces and structured surfaces described above for the viscoelastic lightguide and the first substrate, i.e., the first and second interfaces and the first and second outer surfaces may comprise any of the structured interfaces and surfaces described above for the viscoelastic lightguide and the first substrate. FIGS. 18a and 18b show exemplary combinations of structured surfaces for three layer optical articles. FIG. 18a shows a schematic cross section of exemplary optical article 1800 comprising viscoelastic lightguide 1801 disposed between first substrate 1802 and second substrate 1805. First interface 1803 comprises prismatic features, as described above, for extracting light from the viscoelastic lightguide. First outer surface 1804 and second outer surface 1807 comprises unstructured surfaces, and second interface 1806 comprises an unstructured interface. FIG. 18b shows a schematic cross section of exemplary optical article 1810 comprising viscoelastic lightguide 1811 disposed between first substrate 1812 and second substrate 1815. First interface 1813 and second interface 1816 comprise unstructured surfaces, and first surface 1814 and second surface 1817 comprises lenticular surfaces, as described above, for emitting light from the first and second substrates, respectively.

In some embodiments, first and second interfaces may be structured so that light can be extracted on both sides by the first and second substrates. In some embodiments, first and second interfaces may be structured so that light can be extracted on both sides by the first and second substrates, and first and second outer surfaces may be structured so that light can be emitted from the first and second substrates.

Parameters that may also be varied include the refractive indices of the first substrate, second substrate and the viscoelastic lightguide. The first and second substrates may have refractive indices less than that of the viscoelastic lightguide. The first and second substrates may have refractive indices less than that of the viscoelastic lightguide, and the refractive indices of the first and second substrates are the same or nearly the same. The first and second substrates may have refractive indices less than that of the viscoelastic lightguide, and the refractive indices of the first and second substrates may be different. The first and second substrates may have refractive indices less than that of the viscoelastic lightguide, and the refractive index of the first substrate may be greater than that of the second.

The first and second substrates may have refractive indices greater than that of the viscoelastic lightguide. The first and second substrates may have refractive indices greater than that of the viscoelastic lightguide, and the refractive indices of the first and second substrates are the same or nearly the same. The first and second substrates may have refractive indices greater than that of the viscoelastic lightguide, and the refractive indices of the first and second substrates may be different. The first and second substrates may have refractive indices greater than that of the viscoelastic lightguide, and the refractive index of the first substrate may be greater than that of the second.

The first substrate may have a refractive index less than that of the viscoelastic lightguide, and the second substrate greater than that of the lightguide.

The refractive index difference of the viscoelastic lightguide and the first substrate may be from about 0.002 to about 0.5, from about 0.005 to about 0.5, from about 0.01 to about 0.5, from about 0.02 to about 0.5, from about 0.03 to about 0.5, from about 0.04 to about 0.5, from about 0.05 to about 0.5, from about 0.1 to about 0.5, from about 0.2 to about 0.5, from about 0.3 to about 0.5, or from about 0.4 to about 0.5. The refractive index difference of the viscoelastic lightguide and the second substrate may be from about 0.002 to about 0.5, from about 0.005 to about 0.5, from about 0.01 to about 0.5, from about 0.02 to about 0.5, from about 0.03 to about 0.5, from about 0.04 to about 0.5, from about 0.05 to about 0.5, from about 0.1 to about 0.5, from about 0.2 to about 0.5, from about 0.3 to about 0.5, or from about 0.4 to about 0.5.

Parameters that may also be varied include the compositions of the first substrate, second substrate and the viscoelastic lightguide. The first substrate, second substrate and viscoelastic lightguide may comprise the same composition. The first and second substrate compositions may be different from that of the viscoelastic lightguide. The first and second substrate compositions may be the same, and different from that of the viscoelastic lightguide. The first substrate and viscoelastic layer may comprise the same composition, and different from that of the second substrate. The first substrate, second substrate and viscoelastic lightguide may comprise different compositions.

The first and second substrates may comprise first and second viscoelastic layers, respectively. The first substrate may comprise a viscoelastic layer, and the second substrate does not. The first and second substrates may not comprise viscoelastic layers.

The first and second substrates may comprise first and second PSAs, respectively. The first substrate may comprise a PSA, and the second substrate does not. The first and second substrates may not comprise PSAs.

The first and second substrates may comprise first and second reflectors, respectively. The first substrate may comprise a reflector, and the second substrate does not. The first and second substrates may not comprise reflectors.

The first and second substrates may comprise first and second multilayer optical films, respectively. The first substrate may comprise a multilayer, and the second substrate does not. The first and second substrates may not comprise multilayer optical films.

The first and second substrates may comprise optically clear substrates that may be the same or different. Each substrate has high light transmittance and a low haze value. High light transmittance may be from about 90 to about 100%, from about 95 to about 100%, or from about 99 to about 100% over at least a portion of the visible light spectrum (about 400 to about 700 nm), and haze values may be from about 0.01 to less than about 5%, from about 0.01 to less than about 3%, or from about 0.01 to less than about 1%.

In some embodiments, the first substrate comprises a viscoelastic substrate, and the second substrate comprises a light emitting substrate. The light emitting substrate may comprise a polymeric film having a refractive index greater than that of the viscoelastic lightguide. The light emitting substrate may comprise a structured surface that is a second outer surface such that light can be emitted from the light emitting substrate.

In some embodiments, the first substrate comprises a viscoelastic layer and is a light emitting layer, and the second substrate does not comprise a viscoelastic layer.

In some embodiments, the first and second substrates comprise release liners. The first substrate may comprise a release liner, and the second substrate does not. The first and second substrates may not comprise release liners.

The first substrate may comprise a viscoelastic layer, and the second substrate may comprise an adhesive layer that is not a PSA (it may be hot melt, cold seal, etc. as described above). The first substrate may comprise a PSA, and the second substrate may comprise an adhesive layer that is not a PSA (it may be hot melt, cold seal, etc. as described above). In either case, an additional substrate may be disposed on the first substrate opposite the viscoelastic lightguide. The additional substrate may provide an image as described above. The additional substrate may be translucent.

The first and second substrates may comprise silicone PSAs, and the viscoelastic layer may comprise a (meth)acrylic PSA. The first and second substrates may have refractive indices less than that of the viscoelastic lightguide. The silicone PSAs may be stretch releasable. This optical article may be disposed between first and second glasses which may or may not be the same glass. The first glass is disposed on the first substrate opposite the viscoelastic lightguide, and the second glass on the second substrate opposite the viscoelastic lightguide.

The first substrate may comprise a silicone PSA, and the viscoelastic lightguide may comprise a (meth)acrylic PSA. The first substrate may have a refractive index less than that of the viscoelastic lightguide. The silicone PSA may be stretch releasable. The second substrate may comprise a diffuse reflector comprising a layer of particles and polymer. The particles may comprise glass microspheres and the polymer may comprise an adhesive, or the particles may comprise glass microspheres and the polymer may comprise a (meth)acrylic PSA. An additional substrate may be disposed on the first substrate opposite the viscoelastic lightguide. The additional substrate may provide an image as described above. The additional substrate may be a polymeric film such as a translucent polymeric film. A reflector may be disposed on the diffuse reflector opposite the viscoelastic lightguide.

The first substrate may comprise a polymeric film having a refractive index greater than that of the viscoelastic lightguide, the second substrate may comprise a reflector. The polymeric film may provide an image as described above. The polymeric film may be translucent. An additional substrate may be disposed on the first substrate opposite the viscoelastic lightguide. The additional substrate may comprise a polymeric film.

The first substrate may comprise a polymeric film having a refractive index greater than that of the viscoelastic lightguide, the second substrate may have a refractive index less than that of the lightguide. The polymeric film may provide an image as described above. The polymeric film may be translucent. The second substrate may comprise a viscoelastic substrate. The second substrate may comprise a PSA.

The first substrate may comprise a silicone PSA, the second substrate may comprise a reflector, and the viscoelastic layer may comprise a (meth)acrylic PSA.

The first substrate may comprise a (meth)acrylic light extracting and light emitting substrate, for example, as described in King et al. and Sasagawa et al, the first substrate disposed on the viscoelastic lightguide with the tips of the prismatic structures in contact with the lightguide such that the two are optically coupled. The second substrate comprises a reflector. The viscoelastic lightguide comprises a (meth)acrylic PSA. Any areas of the first substrate may be filled with a pocket material as described above. For example, the pocket material may comprise a silicone PSA having a refractive index less than that of the first substrate and the viscoelastic lightguide.

The first substrate may comprise a silicone PSA having a refractive index less than that of the viscoelastic lightguide. An additional substrate may be disposed on the silicone PSA opposite the viscoelastic lightguide; the additional substrate comprising a (meth)acrylic light extracting and light emitting substrate, for example, as described in King et al. and Sasagawa et al. In this case, the tips of the prismatic structures are not in contact with the lightguide. The second substrate comprises a reflector. The viscoelastic lightguide comprises a (meth)acrylic PSA.

The first and second substrates may comprise (meth)acrylic light extracting and light emitting substrates, for example, as described in King et al. and Sasagawa et al, the substrates disposed on the viscoelastic lightguide with the tips of the prismatic structures in contact with the lightguide such that the two substrates are optically coupled to the lightguide. The viscoelastic lightguide comprises a (meth)acrylic PSA. Any gaps between the substrates and the viscoelastic lightguide are filled with a silicone PSA having a refractive index less than that of the (meth)acrylic substrates and the viscoelastic lightguide.

The first and second substrates may comprise a silicone PSA. A first additional substrate may disposed on the first substrate opposite the viscoelastic layer, and a second additional substrate on the second substrate opposite the viscoelastic layer. The first and second additional substrates may comprise (meth)acrylic films, for example, as described in King et al. and Sasagawa et al. The viscoelastic lightguide comprises a (meth)acrylic PSA.

The first and second substrates may comprise first and second glasses, respectively, which may or may not be the same glass.

In some embodiments, the first substrate comprises a viscoelastic layer, and the second substrate comprises a reflector. The first substrate may comprise a PSA, and the second substrate may comprise a specular reflector. In either case, the first substrate may have a refractive index greater than or less than that of the viscoelastic lightguide.

In some embodiments, the first substrate comprises a light transmissive substrate that is not a viscoelastic layer, and the second substrate comprises a reflector. The first substrate may comprise a polymeric film.

In general, the optical articles described above may have substrates that are interchangeable. For example, a first substrate may comprise an imaged layer that may be exchanged with a different imaged layer. For another example, an additional layer disposed on a first substrate may be exchanged with a different additional layer.

In general, an adhesive layer may be disposed on a surface of any of the optical articles described herein. Suitable adhesives include PSAs, optically clear PSAs, optically diffuse PSAs such as those described above, radiation cured adhesives, hot melt adhesives, cold seal adhesives, heat activated adhesives, structural adhesives having an adhesive bond strength of at least about 6 MPa, and the like.

In general, a release liner may be disposed on the surface of any of the substrates such as the first substrate, second substrate, and/or any additional substrates. Suitable release liners are described above.

In some embodiments, the viscoelastic lightguide may comprise two layers wherein one of the layers comprises particles as described above. In some embodiments, the viscoelastic lightguide may comprise three layers: a first viscoelastic lightguide, a second viscoelastic lightguide disposed on the first viscoelastic lightguide, a polymeric film disposed on the second viscoelastic lightguide opposite the first viscoelastic lightguide, and a third viscoelastic lightguide disposed on the first viscoelastic lightguide opposite the second viscoelastic lightguide. The polymeric film may be designed to emit light.

The viscoelastic lightguides may comprise the same polymer, or they may comprise different polymers. The viscoelastic lightguides may have refractive index differences of from about 0.002 to about 0.5, from about 0.005 to about 0.5, from about 0.01 to about 0.5, from about 0.02 to about 0.5, from about 0.03 to about 0.5, from about 0.04 to about 0.5, from about 0.05 to about 0.5, from about 0.1 to about 0.5, from about 0.2 to about 0.5, from about 0.3 to about 0.5, or from about 0.4 to about 0.5.

The viscoelastic lightguide may be made using any method or process commonly used for making viscoelastic articles. Typical processes comprise those that are continuous processes such as continuous cast and cure, extrusion, microreplication, and embossing methods. Various types of radiation may be used for processes in which a material needs to be cured, e.g., crosslinked. Various types of chemistries, including those that do not require radiation, may be used for materials that need to be cured. If the viscoelastic lightguide is made from a curable material, then the material may be cured before, after or during contact with the light source. If the viscoelastic lightguide is made from a cured material, then the material may be cured before, after or during contact with first and/or second substrates. If a first or second substrate is made from a curable material, then the material may be cured before, after or during contact with the viscoelastic lightguide. If any one or more of the viscoelastic lightguide, first substrate and second substrate is made from a cured material, then the material may be cured using the light source either before, during or after they are optically coupled to the lightguide.

Conventional molding processes may also be used. Molds may be made by micro-machining and polishing of a mold material to create the desired features, structured surfaces, etc. Mold materials include polymeric, glass and metal materials. The molds may need to be suitable for making optically smooth surfaces of the viscoelastic lightguide. The optically smooth surface of the viscoelastic lightguide, if made from curable materials, may be formed by simply allowing the material to cure in air or other atmosphere such that the material levels itself. Laser ablation may be used to structure a surface of the viscoelastic lightguide and molds.

Optical articles comprising the viscoelastic lightguide and a substrate may be made in a number of ways. In some embodiments, the lightguide and substrate may be made separately, contacted and pressed together using finger pressure, a hand roller, an embosser or a laminator.

In some embodiments, the substrate may be formed on the viscoelastic lightguide by coating a substrate material on the lightguide. The substrate material may then be treated to form the substrate. For example, the substrate material may be extruded onto the viscoelastic lightguide in the form of a layer and cooled to solidify the material to form the substrate. Alternatively, the substrate material may be curable and treated by heating and/or applying radiation to form the substrate. The substrate material may include solvent and the substrate is formed by removing the solvent.

In some embodiments, the viscoelastic lightguide may be formed on the substrate by coating a viscoelastic material on the substrate. The viscoelastic material may then be treated to form the viscoelastic lightguide. For example, the viscoelastic material may be extruded onto the substrate in the form of a layer and cooled to solidify the material to form the lightguide. Alternatively, the viscoelastic material may be curable and treated by heating and/or applying radiation to form the lightguide. The viscoelastic material may include solvent and the lightguide is formed by removing the solvent.

In cases where the substrate material or the viscoelastic material is curable, an optical article having a partially cured substrate or lightguide, respectively, may be made. In cases where the substrate material or the viscoelastic material is curable, chemically curing materials may be used such that the material is crosslinked. In cases where the substrate material or the viscoelastic material is curable, the material may be cured before, after and/or during contact with another material or the light source.

In cases where the substrate material or the viscoelastic material is curable using light, the light source may be optically coupled to the material and curing carried out by injecting light from the light source.

A substrate may be used to structure a surface of the viscoelastic lightguide, e.g., the viscoelastic lightguide may not be structured by itself, rather, it becomes structured when contacted with a structured surface of a substrate. It is also possible for the viscoelastic lightguide to have a structured surface such that it deforms a surface of a substrate to create the interface.

The optical articles and optical devices disclosed herein may be provided in any number of ways. The optical articles and optical devices may be provided as sheets or strips laid flat, or they can be rolled up to form a roll. The optical articles and optical devices may be packaged as single items, or in multiples, in sets, etc. The optical articles and light sources may be provided in an assembled form, i.e., as an optical device. The optical articles and light sources may be provided as kits wherein the two are separate from each other and assembled at some point by the user. The optical articles and light sources may also be provided separately such that they can be mixed and matched according to the needs of the user. The optical articles and optical devices may be temporarily or permanently assembled to light up.

The optical articles disclosed herein may be altered depending on a particular use. For example, the optical articles can be cut or divided by any suitable means, e.g., using a scissors or a die cutting method. A particularly useful die cutting method is described in US 2011/0064916 (Sherman et al.). The optical articles and devices may be cut or divided into different shapes such as alphabetic letters; numbers; geometric shapes such as squares, rectangles, triangles, stars and the like. The optical articles and optical devices may be used for signage such as for graphic arts applications.

Marketing Strips with Flexible Lightguides

Figure 19A:
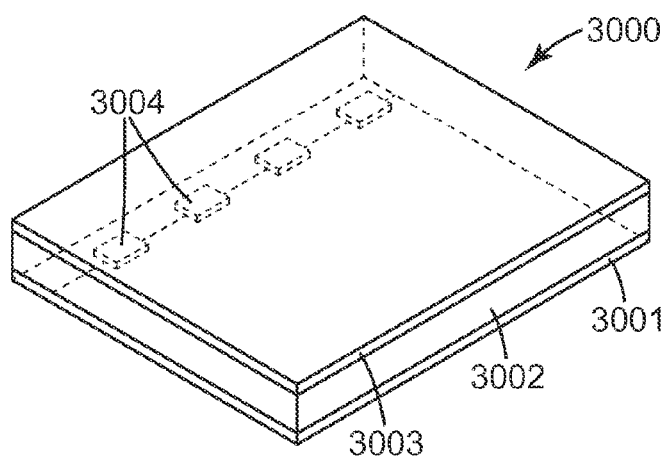
FIG. 19a is a perspective view of a flexible viscoelastic lightguide for a marketing strip or other lighting purposes.
Figure 19B:
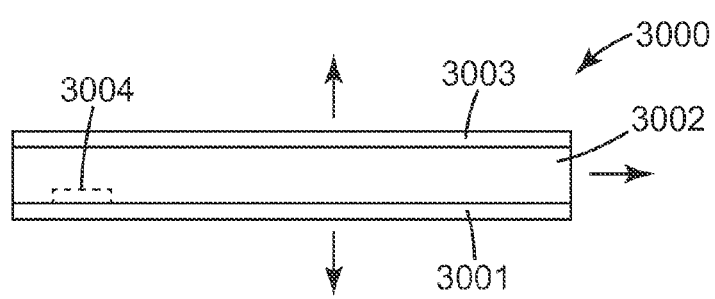

FIGS. 19a and 19b are perspective and side views, respectively, of a flexible lightguide 3000 for a marketing strip or other lighting purposes. Lightguide 3000 includes flexible substrates 3001 and 3003 with a viscoelastic layer 3002 between substrates 3001 and 3003. Light sources 3004 are located within viscoelastic layer 3002. As illustrated by the arrows in FIG. 19b, light from light sources 3004 can be emitted from the bottom substrate 3001, the top substrate 3003, and the front edge of viscoelastic layer 3002.

Lightguide 3000 can correspond with any of the viscoelastic lightguides described herein. Substrates 3001 and 3003 can be implemented with a transparent or translucent flexible film, for example a structured film such as the VIKUITI Brightness Enhancement Film product from 3M Company. Viscoelastic layer 3002 can be implemented with a PSA, for example. Light sources 3004 can be implemented with side-emitting LEDs, for example, or other solid state light sources. In this embodiment, the side-emitting LEDs are arranged to emit light into viscoelastic layer 3002 toward the edge opposite the LEDs. The LEDs can be arranged in the viscoelastic layer to emit light in other directions. The entire article, lightguide 3000, can be flexible. Viscoelastic layer 3002 can have exposed PSA on all four sides between substrates 3001 and 3003 for use in securing lightguide 3000 to another article, for example.

Figure 20A:
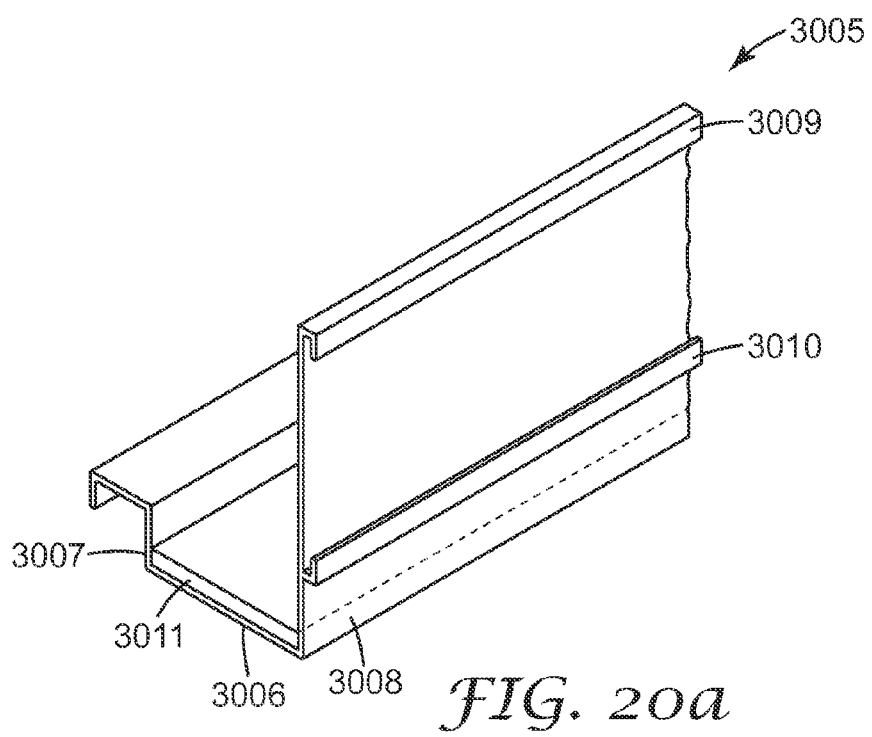
FIG. 20a is a perspective view of a marketing strip having a flexible viscoelastic lightguide.

FIG. 20a is a perspective view of a marketing strip 3005 having a flexible lightguide 3011. Marketing strip 3005 includes an elongated section 3006 having an edge portion 3007 and an elongated section 3008 having ridges 3009 and 3010. Elongated section 3008 is arranged non-parallel with elongated section 3006, for example perpendicular to it. A lightguide 3011, which corresponds with lightguide 3000, is located on elongated section 3006 and secured between edge portion 3007 and elongated section 3008. The exposed PSA within lightguide 3011 secures the lightguide to edge portion 3007 and elongated section 3008. By securing lightguide 3011 onto elongated section 3006, lightguide 3011 can help to stiffen marketing strip 3005 and provide additional structural support.

Figure 20B:
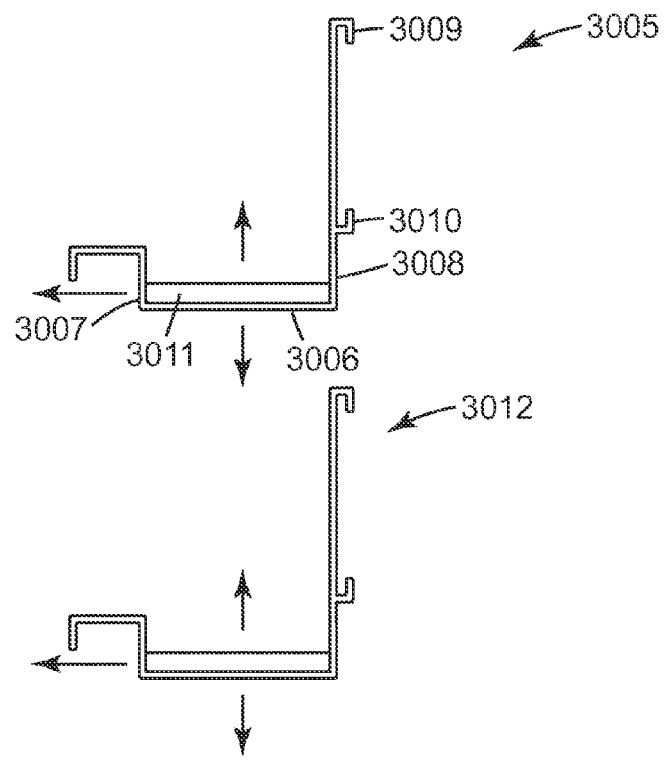
FIG. 20b is a side view of the marketing strip of FIG. 20a and showing multiple marketing strips arranged together.

FIG. 20b is a side view of marketing strip 3005 and showing multiple marketing strips arranged together. In particular, another marketing strip 3012, configured similar to marketing strip 3005, can be arranged below marketing strip 3005. In this example, lightguide 3011 can be secured with the LEDs in the lightguide closest to elongated section 3008. As shown by the arrows in FIG. 20b, light from the lightguides in marketing strips 3005 and 3012 emits in upward, downward, and backward directions. In use, products can be placed on lightguide 3011 and illuminated by it. Ridges 3009 and 3010 can be used to secure a label having prices or product information, for example. Marketing strip 3005 can be secured to a shelf, for example, via edge portion 3007.

Figure 21A:
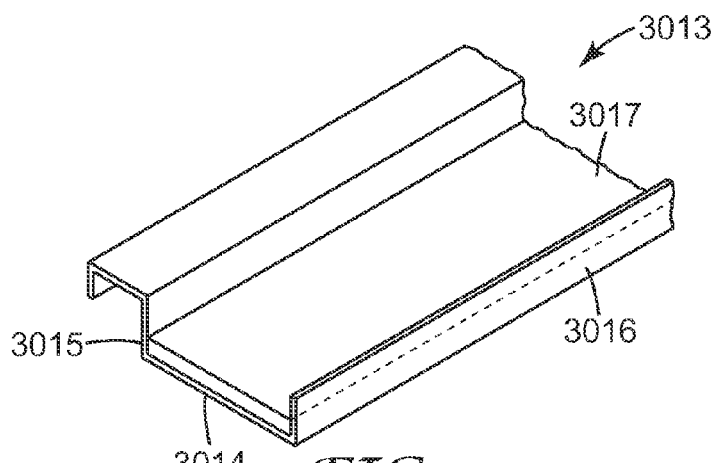
FIG. 21a is a perspective view of another marketing strip having a flexible viscoelastic lightguide.
Figure 21B:
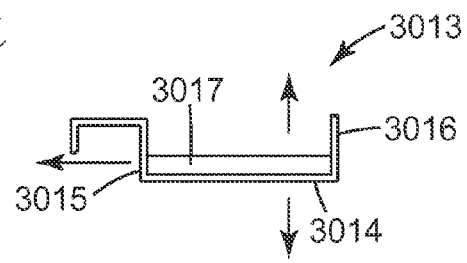

FIGS. 21a and 21b are perspective and side views, respectively, of another marketing strip 3013 having a flexible lightguide. Marketing strip 3013 includes an elongated section 3014 having an edge portion 3015 and an edge portion 3016. A lightguide 3017, which corresponds with lightguide 3000, is located on elongated section 3014 and secured between edge portions 3015 and 3016. The exposed PSA within lightguide 3017 secures the lightguide to edge portions 3015 and 3016. By securing lightguide 3017 onto elongated section 3014, lightguide 3017 can help to stiffen marketing strip 3013 and provide additional structural support. In this example, lightguide 3017 can be secured with the LEDs in the lightguide closest to edge portion 3016. As shown by the arrows in FIG. 21b, light from the lightguide in marketing strip 3013 emits in upward, downward, and backward directions. In use, products can be placed on lightguide 3017 and illuminated by it.

Figure 22A:
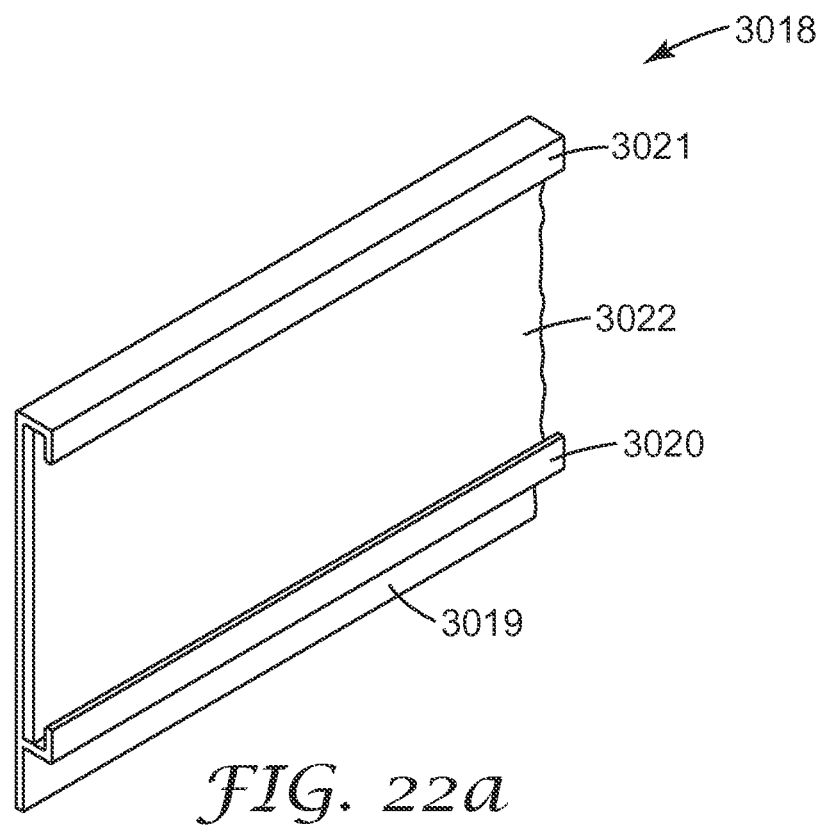
FIG. 22a is a perspective view of another marketing strip having a flexible viscoelastic lightguide.
Figure 22B:
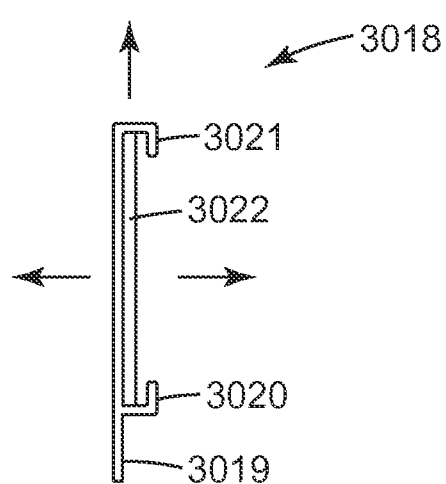

FIGS. 22a and 22b are perspective and side views, respectively, of another marketing strip 3018 having a flexible lightguide. Marketing strip 3018 includes an elongated section 3019. A ridge 3020 is located adjacent an edge of elongated section 3019 with a portion of elongated section 3019 between the edge and ridge 3020. A ridge 3021 is located opposite ridge 3020 and at an edge of elongated section 3019. A lightguide 3022, which corresponds with lightguide 3000, is located on elongated section 3019 and secured between ridges 3020 and 3021. The exposed PSA within lightguide 3022 secures the lightguide to ridges 3020 and 3021. By securing lightguide 3022 onto elongated section 3019, lightguide 3022 can help to stiffen marketing strip 3018 and provide additional structural support. In this example, lightguide 3022 can be secured with the LEDs in the lightguide closest to ridge 3020. As shown by the arrows in FIG. 22b, light from the lightguide in marketing strip 3018 emits in forward, backward, and upward directions. In use, a transparent or translucent label having prices or product information, for example, can be secured on elongated portion 3019 between ridges 3020 and 3021, on a side of lightguide 3022 opposite elongated section 3019, with the light from the LEDs providing backlighting for the label. Alternatively, marketing strip 3018 can be used for general lighting purposes without a label or other component on the lightguide.

Figure 23A:
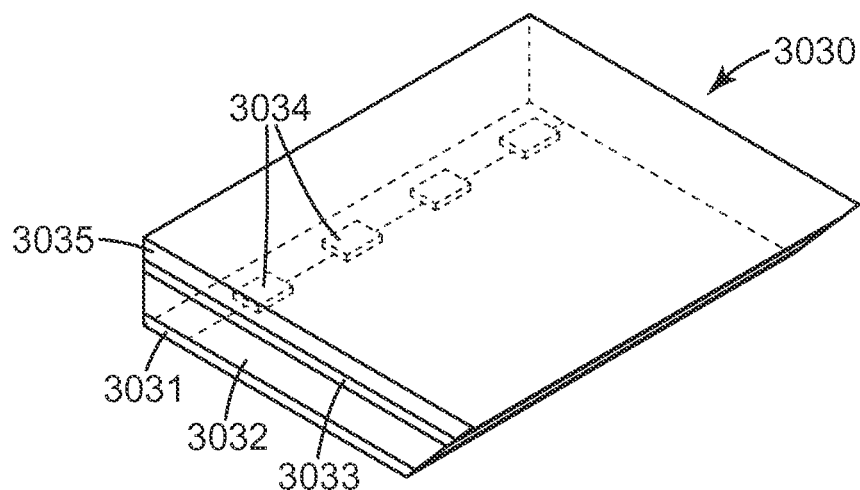
FIG. 23a is a perspective view of another flexible viscoelastic lightguide for a marketing strip or other lighting purposes.
Figure 23B:
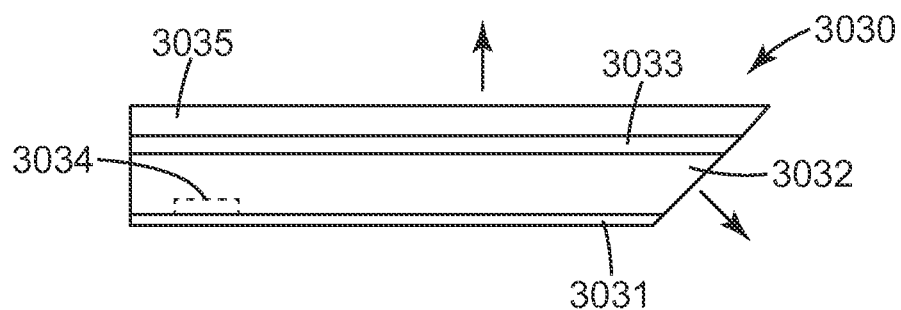

FIGS. 23a and 23b are perspective and side views, respectively, of another flexible viscoelastic lightguide 3030 for a marketing strip or other lighting purposes. Lightguide 3030 includes a reflector 3031 and a flexible substrate 3033 with a viscoelastic layer 3032 between reflector 3031 and substrate 3033. Light sources 3034 are located within viscoelastic layer 3032. A graphic 3035 is located on substrate 3033 on a side opposite viscoelastic layer 3032 and light sources 3034. Lightguide 3030 has a bevelled edge opposite light sources 3034. An entire edge of lightguide 3030 can be bevelled, as shown, or alternatively only a portion of the edge, such as viscoelastic layer 3032, can be bevelled. As illustrated by the arrows in FIG. 23b, light from light sources 3034 can be emitted from substrate 3033 through graphic 3035 and from the bevelled edge. Light can also optionally be emitted from the edge adjacent light sources 3034 and opposite the bevelled edge.

Lightguide 3030 can correspond with any of the viscoelastic lightguides described herein and configured to have a reflector and graphic. Reflector 3031 can be implemented with a flexible reflective film, such as a metallic material, or with a reflective coating on viscoelastic layer 3032. Substrate 3033 can be implemented with a transparent or translucent flexible film, for example a structured film such as the VIKUITI Brightness Enhancement Film product from 3M Company. Viscoelastic layer 3032 can be implemented with a PSA, for example. Light sources 3034 can be implemented with side-emitting LEDs, for example, or other solid state light sources. Graphic 3035 can include, for example, text, logos, drawings, images, branded shapes, photos, or any other static information. The static information can be provided as a print on any type of substantially transparent substrate, for example polymeric films. In some embodiments the static information can comprise a solid color surface, which can optionally also be a structured surface. In some embodiments the static information can comprise a multi-color surface, which can optionally also be a structured surface. In this embodiment, the side-emitting LEDs are arranged to emit light into viscoelastic layer 3032 toward the bevelled edge opposite the LEDs. The LEDs can be arranged in the viscoelastic layer to emit light in other directions. The entire article, lightguide 3030, can be flexible. Viscoelastic layer 3032 can have exposed PSA on all four sides between reflector 3031 and substrate 3033 for use in securing lightguide 3030 to another article, for example.

Figure 24A:
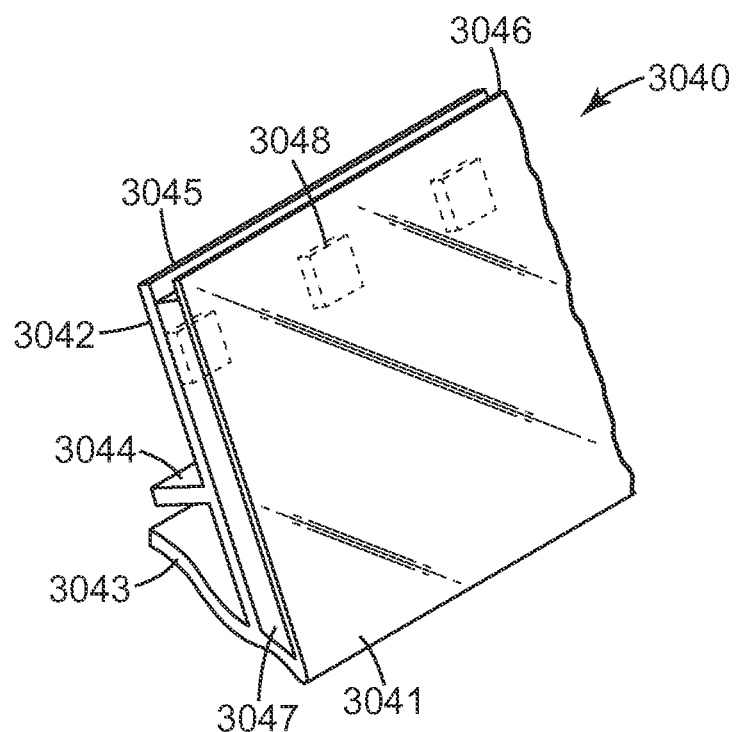
FIG. 24a is a perspective view of another marketing strip having a flexible viscoelastic lightguide.
Figure 24B:
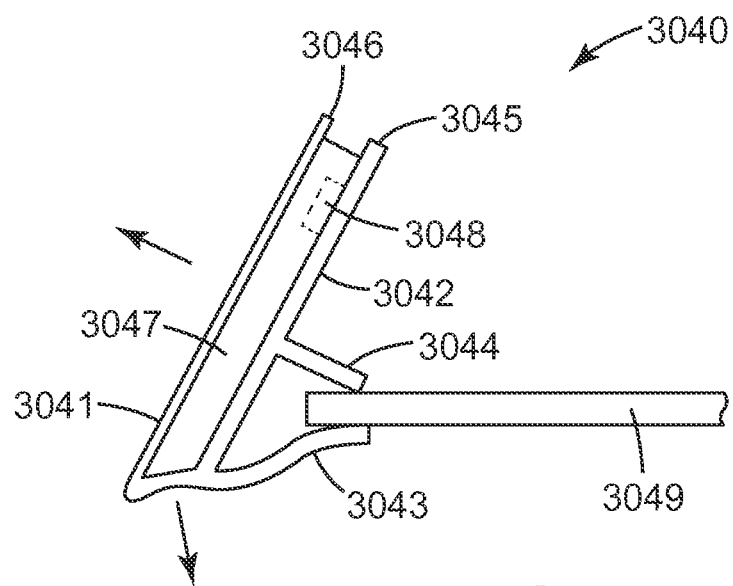

FIGS. 24a and 24b are perspective and side views, respectively, of another marketing strip 3040 having a flexible viscoelastic lightguide. Marketing strip 3040 includes a front elongated section 3041 and a back elongated section 3042, where the front and back elongated sections 3041 and 3042 are at least partially, and possibly fully, co-extensive with one another. A top edge 3046 of front elongated section 3041 and a top edge 3045 of back elongated section 3042 form an opening for inserting and removing a lightguide. A lightguide 3047, which corresponds with lightguide 3030, is located between front elongated section 3041 and back elongated section 3042. Lightguide 3047 can be essentially the same length as the length of marketing strip 3040 or a different length, for example shorter than the length of marketing strip 3040.

Back elongated section 3042 on a side opposite lightguide 3047 includes securing sections 3043 and 3044, both of which extend from back elongated section 3042 on a side opposite lightguide 3047. Securing sections 3043 and 3044 are at least partially, and possibly fully, co-extensive with one another. Securing sections 3043 and 3044 can be slightly flexible and provide for securing marketing strip 3040 to a shelf, for example removably clipping marketing strip 3040 to a shelf 3049 as shown in FIG. 24b. Securing sections 3043 and 3044 can be located at a non-90° angle to back elongated section 3042, as shown, in order to have lightguide 3047 angled backward with respect to shelf 3049. Alternatively, securing sections 3043 and 3044 can be located other non-90° angles or at least substantially perpendicular to back elongated section 3042. As another alternative, marketing strip 3040 can have only one securing section 3043 or 3044, which can be adhered or otherwise attached to a shelf or other mounting structure.

Lightguide 3047 is positioned with light sources 3048 adjacent or closest to top edge 3045 and with the graphic located adjacent, possibly in physical contact with, front elongated section 3041. As shown by the arrows in FIG. 24b, light from lightguide 3047 in marketing strip 3040 emits forward through front elongated section 3041 and downward at a non-zero angle from the bevelled edge in lightguide 3047. The light emitting from the bevelled edge can be used to illuminate products or items located under shelf 3049. Front elongated section 3041 can be implemented with a transparent or translucent plastic material, for example, in order to illuminate the graphic in lightguide 3047. Back elongated section 3042 can be implemented with, for example, a transparent or translucent plastic material or with an opaque material having a particular color or combinations of colors. For example, back elongated section 3042 can have a color matching the color of shelf 3049, or a color matching or complementing the color of products located on shelf 3049 or otherwise proximate marketing strip 3040.

The components of the marketing strips can be implemented with a transparent or translucent plastic material, for example. The marketing strips can have various dimensions based upon, for example, their intended use and a size of the flexible lightguides to be installed within them. In one embodiment, the marketing strips are configured to accommodate a flexible lightguide having a width of approximately one inch and a length of approximately twenty-four inches. The marketing strips with flexible lightguides can be mounted to shelves, for example, or other structures. The elongated sections of the marketing strips are shown as being generally planar. Alternatively, the elongated sections can be curved or otherwise non-planar with the flexible lightguides conforming the non-planar shape of the marketing strips. The lightguides can optionally have only one substrate with a side of the viscoelastic lightguide opposite the substrate being adhered with PSA directly to an elongated section of the marketing strips, although two substrates are preferred for light extraction in the embodiment shown in FIGS. 20a and 20b. The flexible lightguides for use in marketing strips can correspond with, and incorporate any features of, any of the lightguides described herein.

The terms "in contact" and "disposed on" are used generally to describe that two items are adjacent one another such that the whole item can function as desired. This may mean that additional materials can be present between the adjacent items, as long as the item can function as desired.

The invention claimed is:

1. A marketing strip with a flexible lightguide, comprising:
   a first elongated section having an edge portion;
   a second elongated section arranged non-parallel with the first elongated section at a side opposite the edge portion, wherein the second elongated section comprises a transparent or translucent material, the second elongated section includes a first ridge and a second ridge opposite the first ridge, and the first and second ridges are configured to secure a label; and
   the flexible lightguide located on the first elongated section and secured between the edge portion and the second elongated section, the flexible lightguide comprising:
      first and second flexible substrates;
      a viscoelastic layer disposed between the first and second substrates; and
      a light source in the viscoelastic layer, wherein light emitted by the light source enters the viscoelastic layer and is transported within the lightguide by total internal reflection,
   wherein the light from the lightguide emits in an upward direction to illuminate a product when placed on the lightguide.

2. The marketing strip of claim 1, wherein the first and second substrates are transparent or translucent.

3. The marketing strip of claim 1, wherein the first and second substrates each comprise a structured film.

4. The marketing strip of claim 1, wherein light from the light source is emitted from the first and second substrates and from an edge of the viscoelastic layer opposite the light source.

5. The marketing strip of claim 1, wherein the light from the lightguide emits in a backward direction toward the edge portion.

6. The marketing strip of claim 1, wherein the edge portion is configured to secure the marketing strip to a shelf.

7. The marketing strip of claim 1, wherein the second elongated section is arranged perpendicular to the first elongated section.

8. The marketing strip of claim 1, wherein the viscoelastic layer has exposed adhesive for securing the lightguide to the edge portion and the second elongated section.

9. A marketing strip with a flexible lightguide, comprising:
   a front elongated section having a first top edge and comprising a transparent or translucent material;
   a back elongated section having a second top edge, wherein the back elongated section is at least partially co-extensive with the front elongated section, and the first and second top edges form an opening between the front and back elongated sections;
   a first securing section located on and extending from a side of the back elongated section opposite the front elongated section;
   a second securing section located on and extending from the side of the back elongated section opposite the front elongated section, wherein the second securing section is at least partially co-extensive with the first securing section, and the first and second securing sections are configured to removably secure the marketing strip to a shelf; and
   the flexible lightguide located between the front and back elongated sections, the flexible lightguide comprising:
      a flexible substrate;
      a reflector;
      a viscoelastic layer disposed between the substrate and the reflector;
      a graphic on a side of the flexible substrate opposite the viscoelastic layer; and
      a light source in the viscoelastic layer, wherein light emitted by the light source enters the viscoelastic layer and is transported within the lightguide by total internal reflection,
   wherein the flexible lightguide has a bevelled edge on a side of the flexible lightguide opposite the light source, the flexible lightguide is positioned with the graphic adjacent the front elongated section and the light source adjacent the opening, the light is emitted from the lightguide through the graphic and from the bevelled edge, and the light from the bevelled edge exits downward and backward from the marketing strip.

10. The marketing strip of claim 9, wherein the substrate is transparent or translucent.

11. The marketing strip of claim 9, wherein the substrate comprises a structured film.

12. The marketing strip of claim 9, wherein the light is emitted from an edge of the lightguide opposite the bevelled edge.

13. The marketing strip of claim 9, wherein the back elongated section comprises a transparent or translucent material.

14. The marketing strip of claim 9, wherein the back elongated section comprises an opaque material.

15. The marketing strip of claim 9, wherein the first securing section and the second securing section are each at a non-90° angle to the back elongated section.

* * * * *